(12) United States Patent
Masuyama

(10) Patent No.: US 8,218,048 B2
(45) Date of Patent: *Jul. 10, 2012

(54) AMPLIFYING SOLID-STATE IMAGING DEVICE, AND METHOD FOR DRIVING THE SAME

(75) Inventor: Masayuki Masuyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 50 days.

This patent is subject to a terminal disclaimer.

(21) Appl. No.: 12/884,673

(22) Filed: Sep. 17, 2010

(65) Prior Publication Data

US 2011/0007197 A1    Jan. 13, 2011

Related U.S. Application Data

(62) Division of application No. 12/428,143, filed on Apr. 22, 2009, now Pat. No. 7,821,556, which is a division of application No. 11/429,309, filed on May 8, 2006, now Pat. No. 7,532,243, which is a division of application No. 09/417,097, filed on Oct. 13, 1999, now Pat. No. 7,057,655.

(30) Foreign Application Priority Data

Oct. 14, 1998 (JP) .................................... 10-291705

(51) Int. Cl.
    *H04N 3/14* (2006.01)
(52) U.S. Cl. .................... 348/302; 348/296; 348/300
(58) Field of Classification Search ............... None
    See application file for complete search history.

(56) References Cited

U.S. PATENT DOCUMENTS

| 4,316,221 A | * | 2/1982 | Swab ............................ 348/306 |
| 4,484,223 A | | 11/1984 | Tsunekawa |
| 4,603,355 A | | 7/1986 | Yamada et al. |
| 4,682,236 A | * | 7/1987 | Wang et al. .................. 348/306 |
| 4,700,231 A | | 10/1987 | Matsumoto |
| 4,734,583 A | | 3/1988 | Wang et al. |
| 4,862,276 A | | 8/1989 | Wang et al. |
| 5,083,016 A | | 1/1992 | Wyles et al. |
| 5,335,008 A | | 8/1994 | Hamasaki |
| 5,410,348 A | | 4/1995 | Hamasaki |
| 5,546,127 A | | 8/1996 | Yamashita et al. |
| 5,898,168 A | * | 4/1999 | Gowda et al. .............. 250/208.1 |
| 6,037,577 A | | 3/2000 | Tanaka et al. |
| 6,163,386 A | * | 12/2000 | Kobayashi et al. ........... 358/482 |
| 6,215,113 B1 | | 4/2001 | Chen et al. |
| 6,344,877 B1 | | 2/2002 | Gowda et al. |
| 6,445,413 B1 | | 9/2002 | Hosier et al. |
| 6,469,740 B1 | | 10/2002 | Kuroda et al. |

(Continued)

FOREIGN PATENT DOCUMENTS

JP    63-127679    5/1988

(Continued)

*Primary Examiner* — Luong T Nguyen
(74) *Attorney, Agent, or Firm* — McDermott Will & Emery LLP

(57) ABSTRACT

By providing dummy pixels separately from effective pixels, the total number of pixel rows is equalized with the number of horizontal sync signals included in one frame interval (which is called an "HD number"). A period during which a reset signal for an electronic shuttering operation is being supplied to an arbitrary pixel row overlaps with a period during which another pixel row is selected to perform a readout operation thereon. Thus, it is possible to suppress a variation in reset potential among effective pixels.

1 Claim, 21 Drawing Sheets

U.S. PATENT DOCUMENTS

| | | |
|---|---|---|
| 6,493,030 B1 | 12/2002 | Kozlowski et al. |
| 6,512,543 B1 | 1/2003 | Kuroda et al. |
| 6,522,357 B2 | 2/2003 | Beiley et al. |
| 7,532,243 B2 * | 5/2009 | Masuyama .................. 348/302 |

FOREIGN PATENT DOCUMENTS

| | | |
|---|---|---|
| JP | 03-276675 | 12/1991 |
| JP | 04-142889 | 5/1992 |
| JP | 05-227489 | 9/1993 |
| JP | 05-316431 | 11/1993 |
| JP | 06-334923 | 12/1994 |
| JP | 6-339073 | 12/1994 |
| JP | 7-284024 | 10/1995 |
| JP | 08-293591 | 11/1996 |
| JP | 10-93864 | 4/1998 |
| JP | 2000-101608 | 4/2000 |

* cited by examiner

Fig. 9
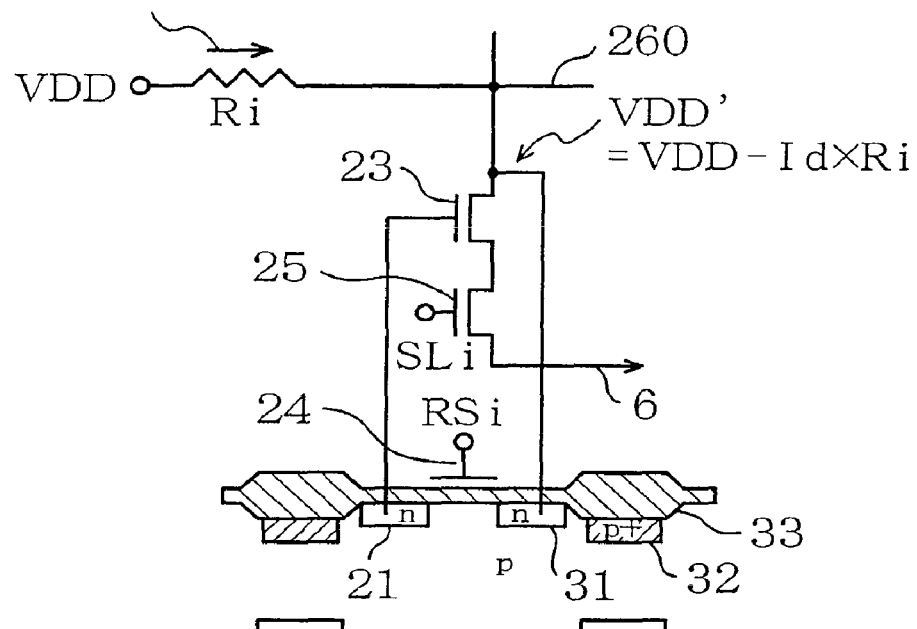
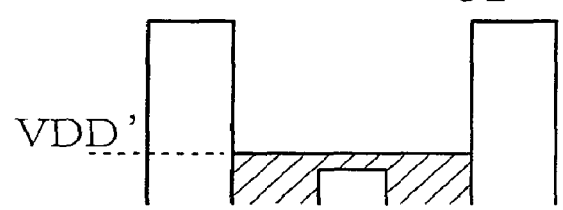
RSi : ON
SLi : ON
SLn : OFF

AMPLIFYING SOLID-STATE IMAGING DEVICE, AND METHOD FOR DRIVING THE SAME

RELATED APPLICATIONS

This application is a divisional of U.S. patent application Ser. No. 12/428,143 filed Apr. 22, 2009, now U.S. Pat. No. 7,821,556, which is a divisional of U.S. patent application No. 11/429,309, filed May 8, 2006, now U.S. Pat. No. 7,532,243, which is a divisional of application Ser. No. 09/417,097, filed Oct. 13, 1999, now U.S. Pat. No. 7,057,655, which claims priority of Japanese Application No. 10-291705, filed Oct. 14, 1998, the contents of each of which are hereby incorporated by reference.

BACKGROUND OF THE INVENTION

The present invention relates to an amplifying solid-state imaging device and a method for driving the same.

An amplifying solid-state imaging device, as well as a CCD solid-state imaging device, adopts "electronic shuttering" as a sort of electronic diaphragm. The "electronic shuttering" operation is performed to reset a signal charge storage section just before a photodiode in each pixel starts to store the signal charge, which has been created by the photodiode itself through photoelectric conversion, thereby making the charge storage period of the photodiode variable. The signal charge stored in pixels is read out on a row-by-row basis responsive to a horizontal sync signal. Thus, the electronic shuttering operation is also performed on the row-by-row basis (which is called a "focal plane operation"). More specifically, the electronic shuttering operation is performed on a certain row and then the signal charge starts to be stored. And after a predetermined time has passed since the start of charge storage, a signal readout operation is performed. When the readout operation is started, the storage section is reset again for the readout. The "predetermined time" defines the charge storage period of each photodiode and is of an equal length for every row. Accordingly, supposing each pixel is receiving light with the same intensity, the same quantity of charge will be stored on each and every row theoretically speaking.

FIG. 1 illustrates a schematic configuration of a conventional amplifying solid-state imaging device 100. In the device 100, an imaging section is made up of a plurality of pixels 102 arranged in columns and rows. Each of these pixels 102 includes a photodiode for storing charge in a quantity corresponding to the amount of light received. As shown in FIG. 1, a row select encoder 103 for selecting one pixel row after another from the imaging section is disposed on the right-hand side of the imaging section. In the example illustrated in FIG. 1, the number of pixel rows is m, which is equal to or larger than two. The row select encoder 103 includes the number m of row selectors that are connected in series to each other. An $i^{th}$ (where $1 \leq i \leq m$) row selector generates a reset signal for the electronic shuttering operation at a predetermined time, and then sends the signal to all the pixels 102 belonging to the $i^{th}$ row. The row selectors included in the row select encoder 103 output the reset signal for the electronic shuttering operation at respectively times, which are different from each other among the rows. That is to say, the reset signal is sequentially output in the descending order, i.e., from the first through $m^{th}$ rows.

On the other hand, the row selecting operation for readout (i.e., an ordinary row selection) is also performed sequentially by the number m of row selectors. The interval between the electronic shuttering and readout operations is preset at the same length for every row. The signal read out from a selected row is supplied by a column select driver 107 to an output buffer 111, from which the signal is output as a pixel signal.

When the electronic shuttering operation is performed, the photodiode within each pixel 102 has the potential thereof compulsorily reset at a predetermined level (which will be called a "reset potential" in this specification). The reset potential is supposed to be the same in each and every pixel 102 as a matter of principle. However, the present inventors found that since a reset potential on a certain row might shift into a different reset potential on another row, horizontal noise might appear on the screen as a result. The horizontal noise always appears on a particular set of rows on the screen, thus degrading the resultant image quality.

SUMMARY OF THE INVENTION

An object of the present invention is providing (1) an amplifying solid-state imaging device that can substantially eliminate the horizontal noise resulting from the electronic shuttering operation and (2) a method for driving the device.

To achieve this object, the present invention provides dummy pixel rows and drives these dummy pixel rows in the same way as an imaging section within an effective pixel area, thereby providing a reset signal for the electronic shuttering operation to each pixel row in the imaging section. As a result, the reset potentials resulting from the electronic shuttering operation can be equalized among all the pixels within the imaging section, thus eliminating the horizontal noise from the screen.

BRIEF DESCRIPTION OF THE DRAWINGS

FIGS. 7, 8, 9 and 10 illustrate an equivalent circuit of a pixel on the $i^{th}$ row, a schematic cross-sectional structure of the resetting device and a distribution of surface potentials at the times a-1, b-1, c and d shown in FIG. 6, respectively.

DETAILED DESCRIPTION OF THE INVENTION

Figure 1:
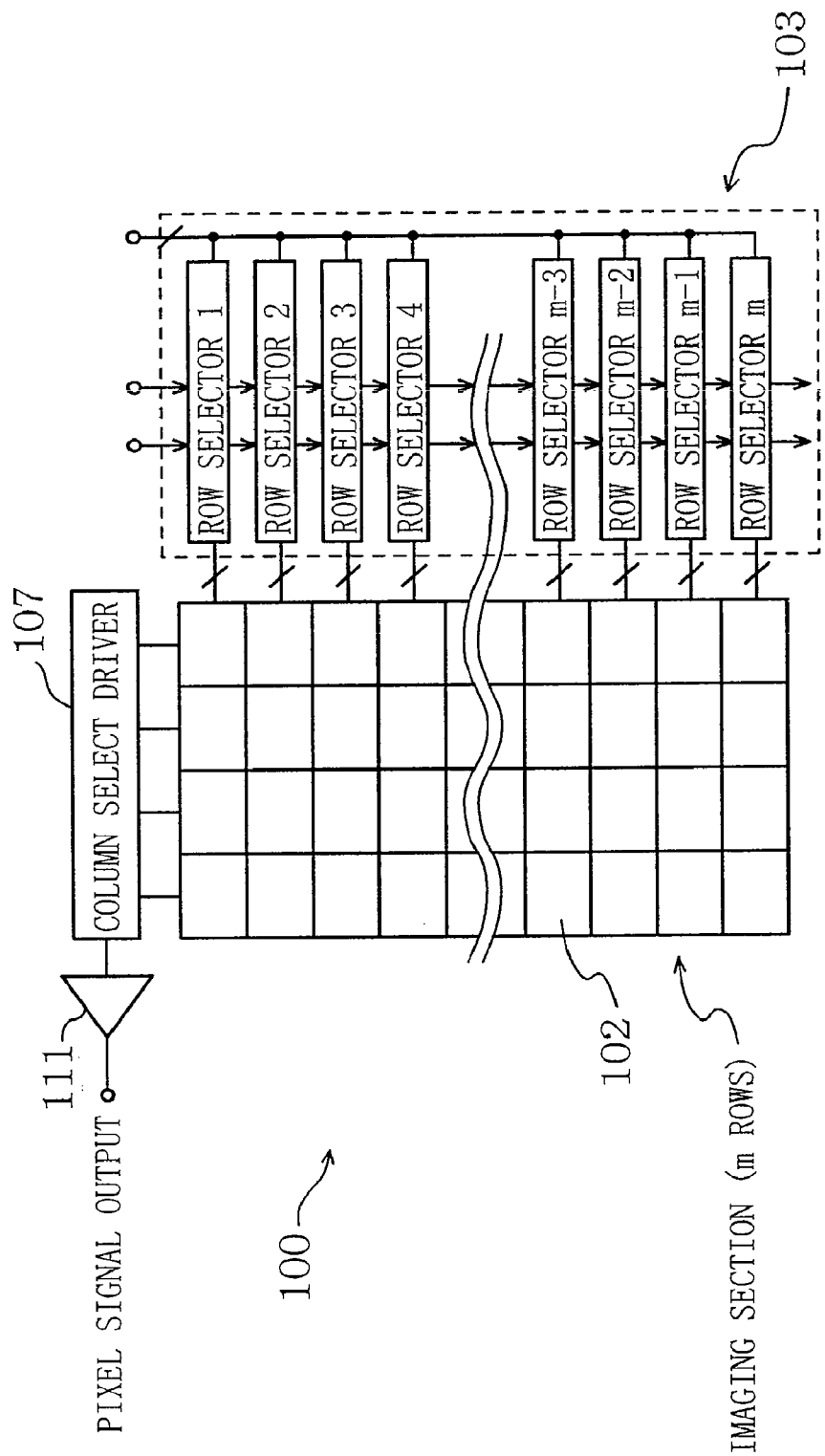
FIG. 1 illustrates a schematic configuration of a conventional amplifying solid-state imaging device.
Figure 2:
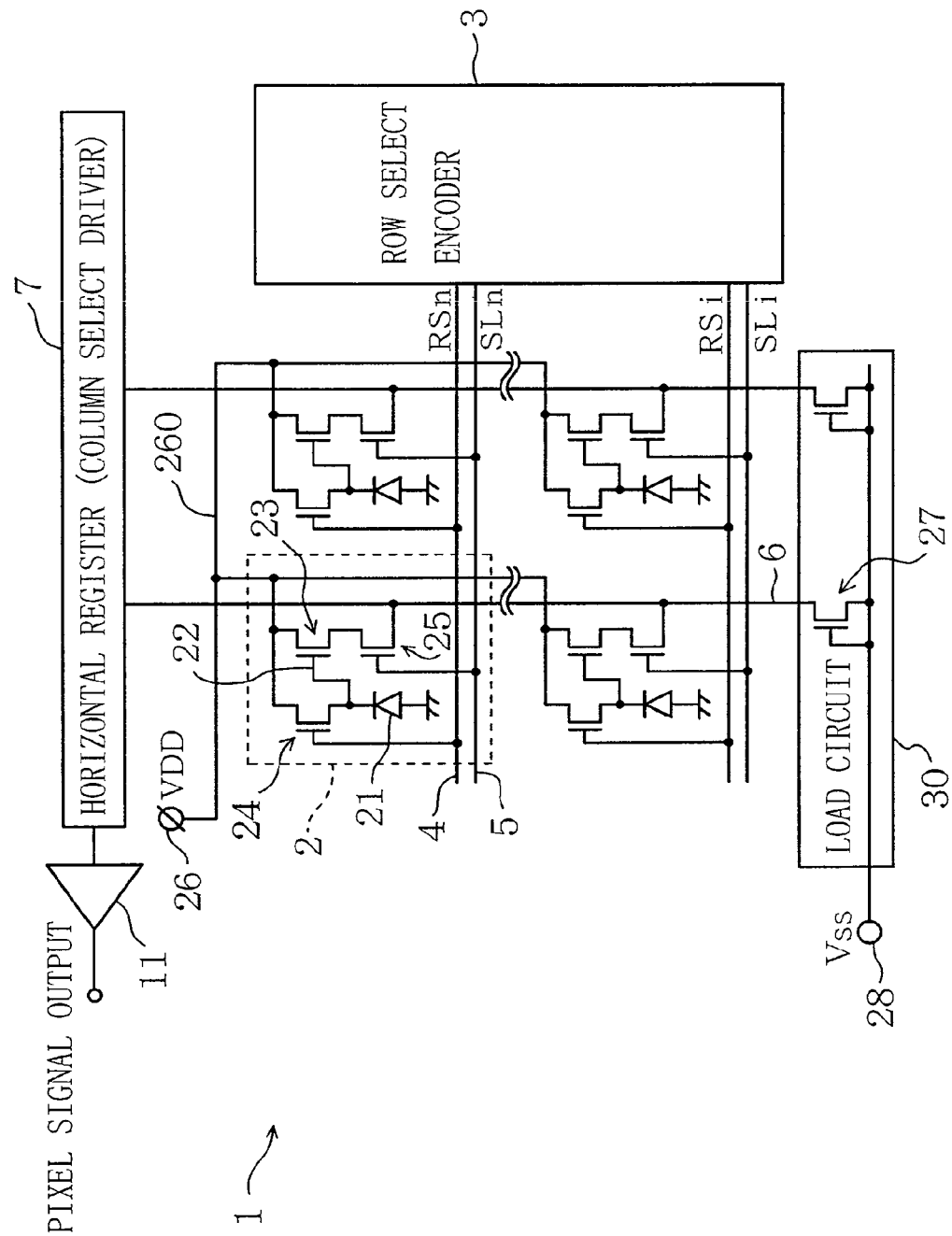
FIG. 2 illustrates a detailed configuration of a pixel in an amplifying solid-state imaging device.
Figure 3:
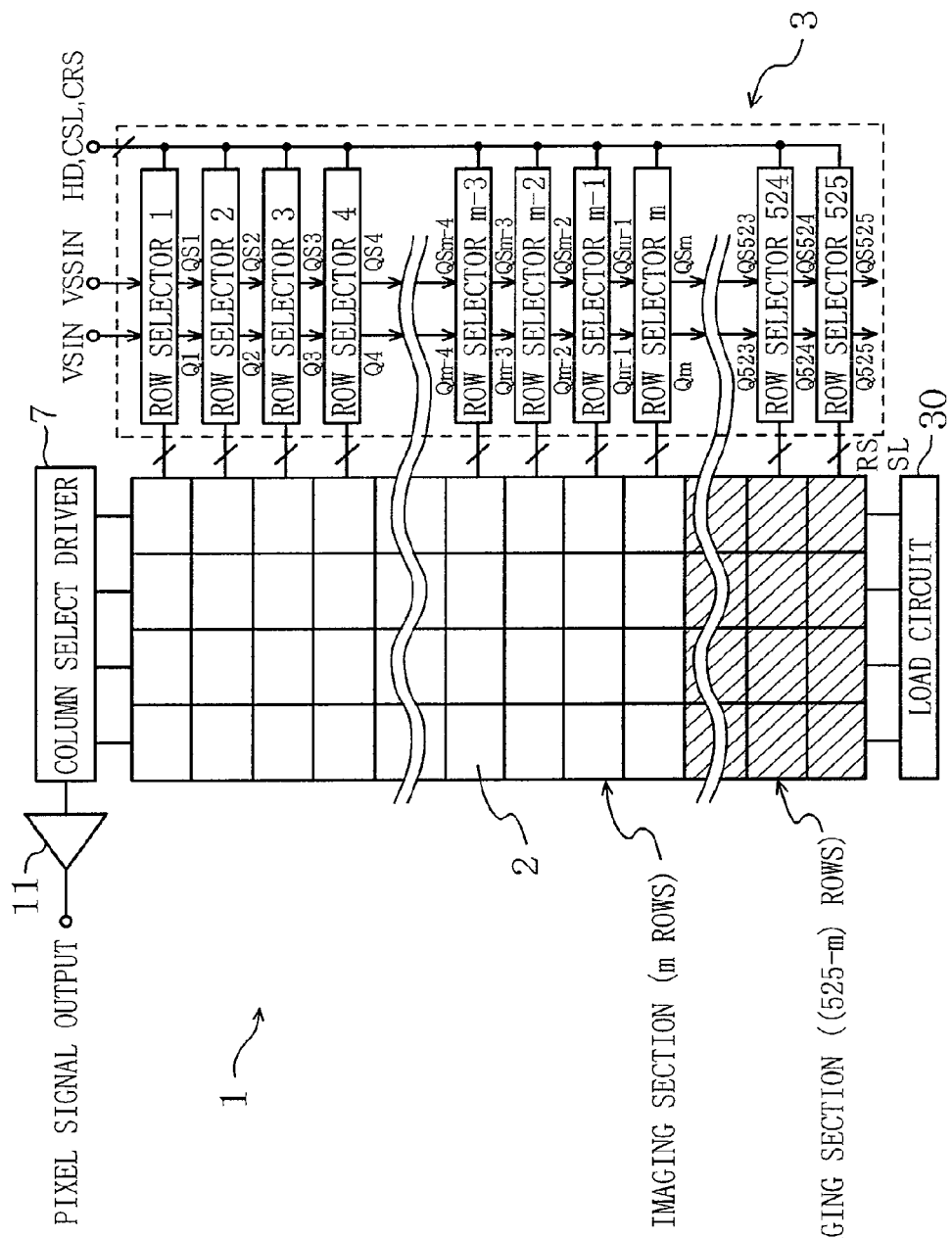
FIG. 3 illustrates a configuration for an amplifying solid-state imaging device according to a first embodiment of the present invention.

Hereinafter, preferred embodiments of an amplifying solid-state imaging device according to the present invention will be described with reference to the accompanying drawings. FIGS. 2 and 3 illustrate a configuration of an amplifying solid-state imaging device 1 according to a first exemplary embodiment of the present invention.

First, referring to FIG. 2, the amplifying solid-state imaging device 1 includes a plurality of pixels 2 arranged in matrix, i.e., in columns and rows, within a semiconductor region, which may be a region in a silicon substrate. Although a 2×2 matrix of pixels is illustrated in FIG. 2, a great number of pixels are actually formed in columns and rows. In this specification, the respective numbers of rows and columns of pixels provided within an effective pixel area to generate pixel signals are represented by m and l (where m and l are both positive integers equal to or larger than two). In a typical solid-state imaging device, m and l are both within the range from 50 to 2,000. In this embodiment, m and l are supposed to be 480 and 640, respectively.

Each of these pixels 2 includes a signal storage section, which in turn includes a photoelectric transducer like a photodiode. Responsive to light incident on the photoelectric transducer, each signal storage section can store information, corresponding to the intensity of the light, as a "potential or a quantity of charge". Although each photoelectric transducer is in a first potential state (reset potential) during resetting, a state transition subsequently takes place from the first into a second potential state as a result of creation and storage of charge responsive to the incident light. The second potential state is represented by a level variable with the intensity of the incoming light. In this specification, the "second potential state" is variable with the total amount of light that has been incident on the photoelectric transducer after resetting was performed as the electronic shuttering operation. A more detailed internal configuration of each pixel 2 will be described later.

The device 1 includes a plurality of lines and circuits for selecting and accessing a particular one of the pixels 2. These lines, circuits, transistors constituting respective pixels and so on are formed on a substrate by various techniques similar to well known ones for fabricating a semiconductor integrated circuit. In this embodiment, a row select encoder 3 is electrically connected to all of the pixels 2 through plural pairs of reset and row select lines 4 and 5. Each single reset line 4 is connected to all of the pixels 2 belonging to a single row associated with the reset line 4. In the same way, each single row select line 5 is also connected to all of the pixels 2 belonging to a single row associated with the row select line 5. That is to say, the number of the pairs of lines 4 and 5, extending from the row select encoder 3, is equal to the number of the pixel rows in the matrix.

To select a particular one of the rows, the row select encoder 3 selectively changes the potential on a row select line 5 associated with the particular row from logically "Low" into "High", for example. In this case, the potentials on the other row select lines 5 associated with the remaining rows are held at logically "Low". As a result, a potential, corresponding to the logically "High" state, is supplied to the respective control terminals of switching devices in all the pixels 2 included in the particular row, thereby turning these switching devices ON. Upon the activation of the switching devices, potentials, corresponding to the information that has been stored in respective signal storage sections on the selected row, appear on associated vertical signal lines 6. In this case, the signal storage section of each pixel 2 is electrically disconnected from an associated vertical signal line 6 on the remaining rows other than the selected one. The configuration and operation of a circuit for sensing information this way will be described in greater detail later.

The information, which has been stored in the signal storage sections of all the pixels 2 included in a selected row, is output to all the corresponding vertical signal lines 6 and then read out column by column by a horizontal shift register (column select driver) 7. The information is ultimately output as a signal through an output buffer (output amplifier) 11.

Next, the configuration of each pixel 2 according to this embodiment will be described in further detail. As shown in FIG. 2, the pixel 2 includes: a photodiode 21 functioning as a signal storage section; and an MOS transistor 23, whose gate electrode 22 is connected to the photodiode 21. The photodiode 21 is implementable as a pn junction diode formed in a silicon substrate, for example. The MOS transistor 23 may have an ordinary MOS structure including channel, source and drain regions within a silicon substrate, for example. The MOS transistor 23 functions as a driver (amplifier) in a signal detector, which plays an important role in amplifying and reading out a tiny variation in the potential state of the photodiode 21. In the illustrated embodiment, no capacitor is particularly inserted between the gate electrode 22 of the MOS transistor 23 and the photodiode 21. Optionally, a capacitor may be inserted therebetween.

The pixel 2 further includes a resetting device 24 and a switching device 25. The resetting device 24 is an MOS transistor (reset transistor), whose gate electrode is connected to an associated reset line 4. The drain of the MOS transistor 24 is connected to a first power supply terminal ($V_{DD}$) 26 through a power line 260, and the source thereof is connected to the photodiode 21. When the potential on the reset line 4 associated with the selected row is selectively changed by the row select encoder 3 from logically "Low" into "High", the resetting devices 24 on the selected row turn ON. As a result, the charge stored on the photodiodes 21 is drained toward the first power supply terminal ($V_{DD}$) 26 through the power line 260. The potential at each photodiode 21, i.e., that at the gate electrode 22 of the driver 23, is compulsorily reset at a certain value determined by the supply potential $V_{DD}$ at the first power supply terminal 26. After the resetting operation is finished, the potential at the photodiode 21 gradually varies with the intensity of light received by the pixel 2. It is because carriers are created due to the photoelectric conversion function of the photodiode 21 and then stored in the photodiode 21 that the potential state of the photodiode 21 is variable with the incidence of light.

The switching device 25 in each pixel 2 is an MOS transistor, whose gate electrode is connected to an associated row select line 5. The drain of the MOS transistor 25 is connected to the source of the driver 23 and the source thereof is connected to an associated vertical signal line 6. When the potential on the row select line 5 shown in FIG. 2 is selectively changed by the row select encoder 3 from logically "Low" into "High", the switching device 25 turns ON. As a result, current flows from the first power supply terminal ($V_{DD}$) 26 through the driver 23, switching device 25, vertical signal line 6 and load device 27 into a second power supply terminal ($V_{SS}$) 28. In this case, the potential on the vertical signal line 6 is variable with the potential state of the photodiode 21 (i.e., the potential at the gate electrode 22 of the MOS transistor 23). Accordingly, the potential on the vertical signal line 6 has a level variable with the second potential state at the signal storage section of the pixel 2.

Considering a particular column, the driver 23, belonging to the selected row, and an associated load device 27 are connected in series to each other between the first and second power supply terminals ($V_{DD}$) 26 and ($V_{SS}$) 28 to form a source follower circuit. In other words, a single load device 27 is allocated to each column, and each driver 23 on the selected row is electrically connected to an associated load device 27 via an associated switching device 25. Such a source follower circuit can amplify the quantity of signal charge stored in each pixel and then output the charge as a potential signal. In this specification, the load devices 27 corresponding to all the columns will sometimes be collectively called a "load circuit" 30.

To utilize the chip area effectively, the same power is supplied from the first power supply terminal ($V_{DD}$) 26 through the common power line 260 to the photodiodes 21 for the resetting purpose, and to the source follower circuits.

Next, the feature of the amplifying solid-state imaging device 1 according to the first embodiment will be described with reference to FIG. 3. As shown in FIG. 3, the device 1 additionally includes at least one dummy pixel row, which is provided separately from the number m of ordinary pixel rows. The number m of pixel rows are located within an effective pixel area and make up an imaging section. On the other hand, the at least one dummy pixel row is located out of the effective pixel area and makes up a dummy imaging section. According to this embodiment, the number of the dummy pixel row(s) is obtained by subtracting m from the number of horizontal sync signals included in one frame interval. In this specification, the number of the horizontal sync signals per frame interval will be called an "HD number". In this exemplary embodiment, since m is 480 and the HD number is 525 (in compliance with the NTSC standard), the number of the dummy pixel row(s) (=HD number−m) is 45.

Each of the pixels belonging to every dummy pixel row has totally the same configuration as each pixel located within the effective pixel area. That is to say, each pixel on every dummy pixel row also includes the photodiode 21 and transistors just like the pixel 2 shown in FIG. 2, and is also connected to the load circuit 30 and to the column select driver 7 through the associated vertical signal line 6. Thus, according to this embodiment, the ordinary imaging section cannot be distinguished from the dummy imaging section by appearances.

When a dummy pixel row is selected by the row select encoder 3, the resetting and switching devices 24 and 25 included in the pixels belonging to the dummy pixel row receive a control signal and operate normally. Turn the switching device 25 ON within a dummy pixel, and a current flows from the first power supply terminal ($V_{DD}$) 26 through the driver 23 and switching device 25 within the dummy pixel, vertical signal line 6 and load device 27 into the second power supply terminal ($V_{SS}$) 28 as shown in FIG. 2.

However, the dummy pixels do not have to store signal information responsive to incoming light. Instead, each dummy pixel has only to allow the current to flow from the first power supply terminal ($V_{DD}$) 26 through the driver 23, switching device 25, vertical signal line 6 and load device 27 into the second power supply terminal ($V_{SS}$) 28 by turning the switching device 25 ON just like an ordinary pixel. Accordingly, the dummy pixels need not perform photoelectric conversion function, either. In view of their intended function, the dummy pixels may be covered with a light blocking film and need not include any photodiode. That is to say, the role expected of the dummy pixel row is to equalize the reset potentials among all the rows within the imaging section by preventing a reset state from being varied on a pixel row, on which resetting is being carried out as the electronic shuttering operation. This function of the dummy pixel row will be described in further detail later. Before that, it will be described with reference to FIG. 4 how the device 1 is driven.

Figure 4:
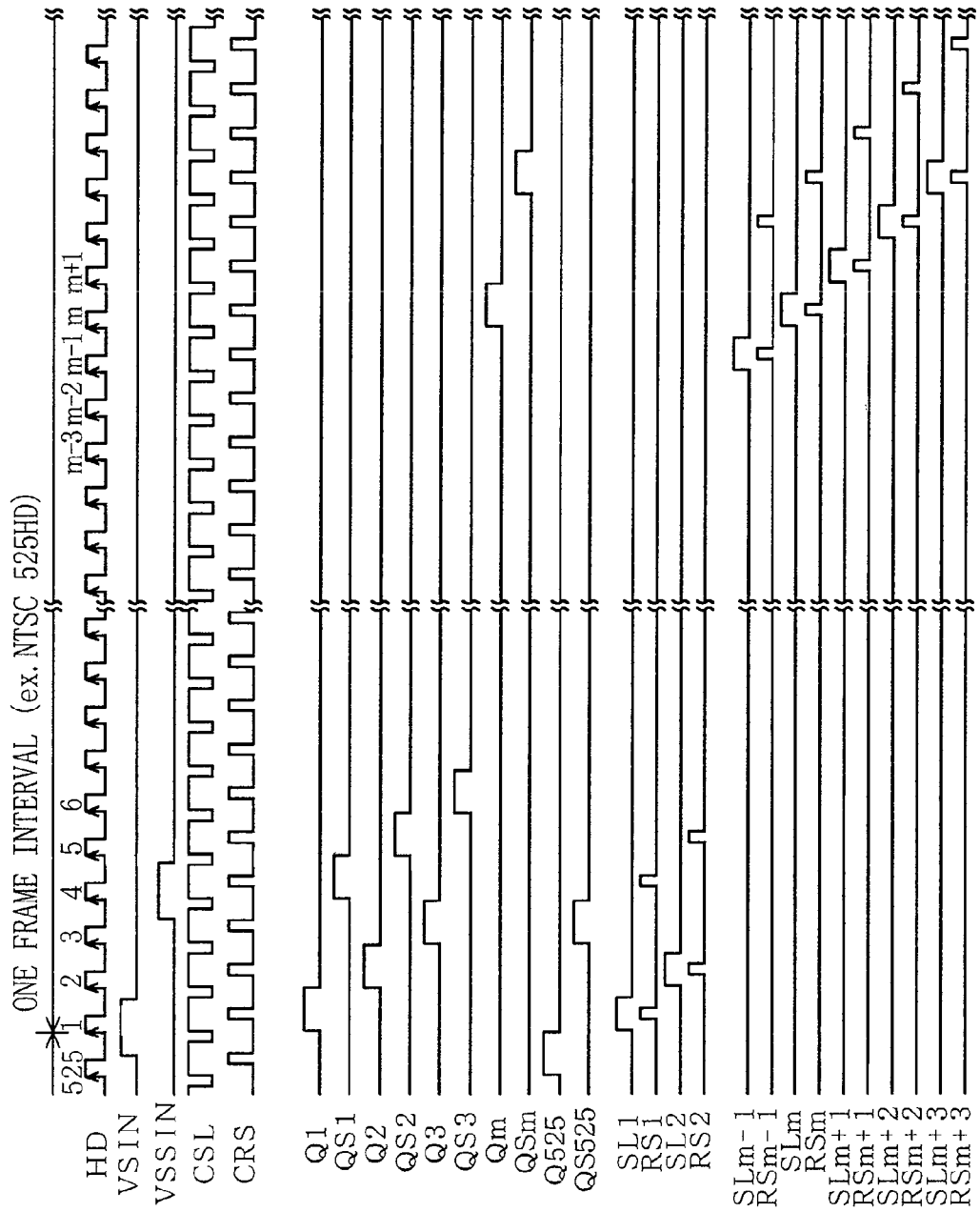
FIG. 4 is a timing diagram illustrating control signals supplied by the row selectors within the row select encoder shown in FIG. 3.

FIG. 4 is a timing diagram illustrating control signals supplied by the row selectors included in the row select encoder 3. On the top of FIG. 4, the waveform of the horizontal sync signal HD is illustrated. In synchronism with the horizontal sync signal HD, the row selectors send the row select signals $SL_1$ through $SL_{m+3}$ and reset signals $RS_1$ through $RS_{m+3}$ to associated rows. In FIG. 4, only the signals associated with just a few rows are illustrated. It is noted that the time progresses rightward in FIG. 4.

In FIG. 4, VSIN is a signal getting a row selecting operation for signal reading started by the row select encoder 3. VSSIN is a signal getting a row selecting operation for electronic shuttering started by the row select encoder 3. The signal VSIN is input to the row select encoder 3 once a frame interval, while the signal VSSIN is input to the row select encoder 3 at least once a frame interval. CSL is a selection sync signal defining respective times the readout operation should be performed, while CRS is a reset sync signal defining respective times the reset operation should be performed. The row select encoder 3 receives these signals and generates various types of control signals in synchronism with the horizontal sync signal HD, thereby performing the electronic shuttering and row selecting operations.

Figure 5:
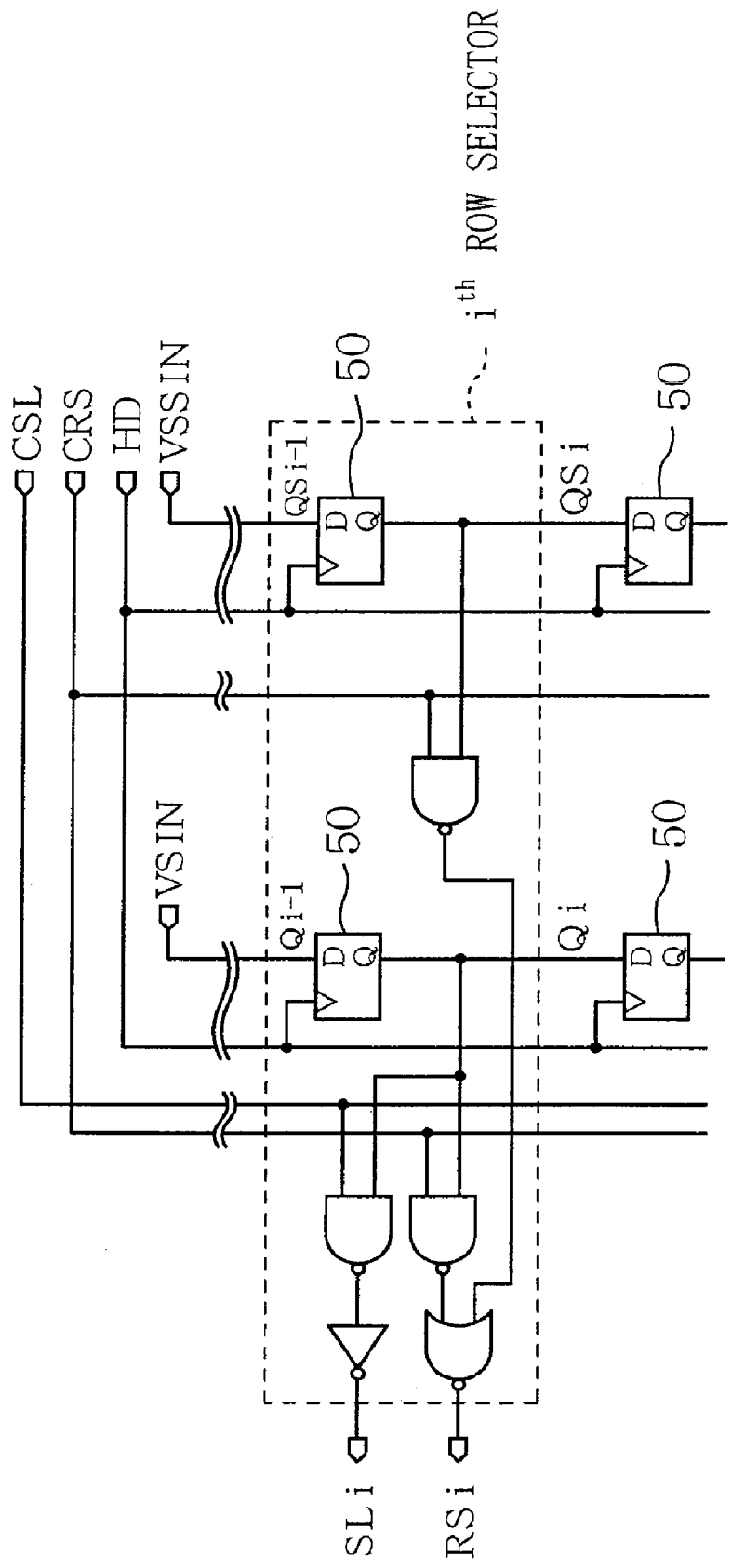
FIG. 5 is a circuit diagram illustrating a row selector associated with an $i^{th}$ row and included in the row select encoder shown in FIG. 3.

FIG. 5 illustrates a row selector associated with an $i^{th}$ row. The row selectors associated with the first through $(m+3)^{rd}$ rows, each having the configuration shown in FIG. 5, are connected in series together to form the row select encoder 3. The row select encoder 3 includes two columns of vertical shift registers, i.e., first and second shift registers. Each vertical shift register includes a plurality of flip-flop circuits 50, which are connected in series to each other.

The $1^{st}$-row part of the first shift register receives the horizontal sync signal HD and the start pulse signal VSIN supplied as a trigger of the readout operation. The output $Q_i$ of the $i^{th}$-row part of the first shift register is supplied to the D terminal of the flip-flop circuit 50 included in the $(i+1)^{st}$-row part of the first shift register. In this manner, the first shift register sequentially performs such an output operation from the first through the last rows in synchronism with the horizontal sync signal HD. On the other hand, the $1^{st}$-row part of the second shift register receives the horizontal sync signal HD and the start pulse signal VSSIN supplied as a trigger of the electronic shuttering operation. The output $QS_i$ of the $i^{th}$-row part of the second shift register is supplied to the D terminal of the flip-flop circuit 50 included in the $(i+1)^{st}$-row part of the second shift register. In this manner, the second shift register also performs a similar output operation sequentially from the first through the last rows in synchronism with the horizontal sync signal HD.

Based on the outputs $Q_i$ and $QS_i$ of the first and second shift registers, the selection sync signal CSL and the reset sync signal CRS, the row select encoder 3 generates the row select signal $SL_i$ and reset signal $RS_i$ at respective times shown in FIG. 4. Then, the row select encoder 3 supplies these control signals to the pixels on the $i^{th}$ row through the row select and reset lines 5 and 4 associated with the $i^{th}$ row.

Referring back to FIG. 4, while the signal VSIN is being at the logically "High" level, a first pulse of the horizontal sync signal HD is supplied as the first HD for the frame interval in question. Thereafter, when the $525^{th}$ HD is supplied, the frame interval ends. And after the signal VSIN has risen to the "High" level, the next frame interval starts.

In synchronism with the first HD, the row select encoder 3 generates the row select signal $SL_1$ and the reset signal $RS_1$ and sends these control signals to the pixels on the first row to perform a readout operation on the pixels belonging to the first row. Thereafter, in synchronism with the second HD, the row select encoder 3 generates the row select signal $SL_2$ and the reset signal $RS_2$ and sends these control signals to the pixels on the second row to perform a readout operation on the pixels belonging to the second row. A similar operation will be sequentially performed on the remaining rows.

On the other hand, in synchronism with the horizontal sync signal supplied while the signal VSSIN is being at the logically "High" level (i.e., the fourth HD in FIG. 4), the row select encoder 3 generates the reset signal $RS_1$ and sends the signal to the pixels on the first row. As a result, resetting for the electronic shuttering operation is carried out on all the pixels belonging to the first row. Thereafter, in synchronism with the fifth HD, the row select encoder 3 generates the reset signal $RS_2$ and sends the signal to the pixels on the second row. As a result, resetting for the electronic shuttering operation is carried out on all the pixels belonging to the second row. A similar operation will be sequentially performed on the remaining rows.

As can be seen from FIG. 4, whenever a reset signal for the electronic shuttering operation is supplied to an arbitrary $i^{th}$ (where $1 \leq i \leq m$) row included in the effective pixel area, a readout operation is performed on another row. For example, while resetting for the electronic shuttering operation is being performed on the $m^{th}$ row, a readout operation is being performed on the $(m+3)^{rd}$ row. Were it not for the dummy pixel rows, i.e., the $(m+1)^{st}$ through $(m+3)^{rd}$ rows in this case, the readout operation could not be performed on any row while resetting for the electronic shuttering operation is being performed on the $(m-2)^{nd}$ the $m^{th}$ rows According to this embodiment, dummy pixel rows are provided and driven just like the other rows in the imaging section within the effective pixel area. In this manner, a reset signal for the electronic shuttering operation can be supplied to each and every row within the imaging section under the same condition. Thus, reset potentials resulting from the electronic shuttering operation can be equalized among all the pixels within the imaging section, and therefore, no horizontal noise appears on the screen anymore. Hereinafter, it will be described in further detail why the horizontal noise disappears thanks to the existence of dummy pixels.

Figure 6:
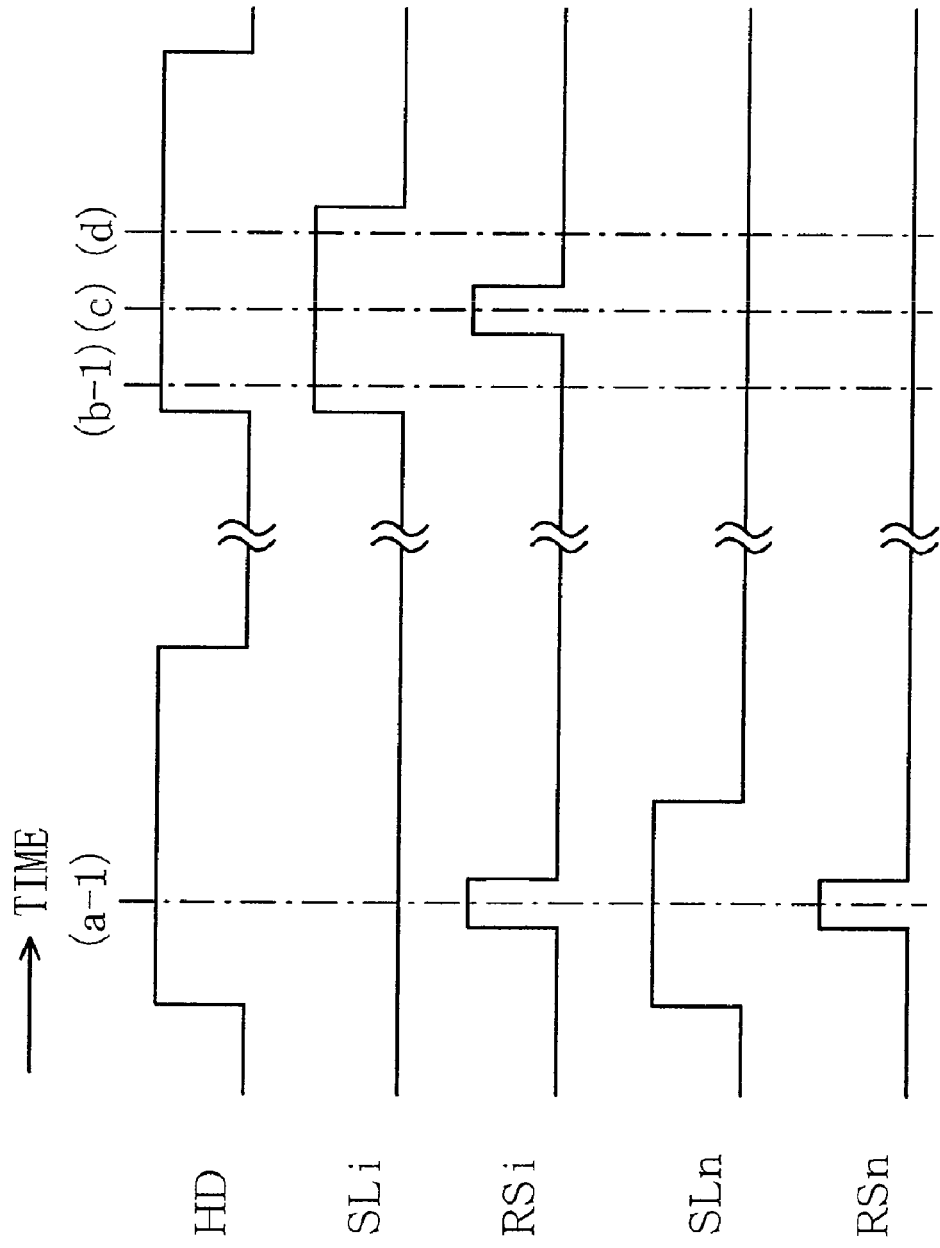
FIG. 6 is a timing diagram illustrating some control signals associated with the $i^{th}$ and $n^{th}$ rows in the device shown in FIG. 3, where $1 \leq i \leq m$ and $n \neq i$.

FIG. 6 is a timing diagram illustrating respective control signals associated with the $i^{th}$ and $n^{th}$ rows, where $1 \leq i \leq m$ and $n \neq i$. First, at a time a-1, a control signal for the electronic shuttering operation is being supplied to the $i^{th}$ row, but the row select signal $SL_i$ remains "Low". Accordingly, the switching devices 25 on the $i^{th}$ row are kept OFF. In contrast, since the reset signal $RS_1$ has risen to the "High" level, the MOS transistors, which function as the resetting devices 24 on the $i^{th}$ row, have been turned ON and are now conducting. As a result, the first power supply terminal $(V_{DD})$ 26 is electrically connected to the photodiodes 21, and the charge that has been stored on the photodiodes 21 is drained to the first power supply terminal $(V_{DD})$ 26. By performing the reset operation in this manner, the potential in the charge storage region of each of these photodiodes 21 is compulsorily reset at the first potential.

Next, at a time b-1, a readout operation is being performed on the $i^{th}$ row. The readout operation is started by turning the switching devices 25 on the $i^{th}$ row ON with the rise of the row select signal $SL_i$ from the "Low" into "High" level. While the switching devices 25 on the $i^{th}$ row are conducting, current flows from the first power supply terminal $(V_{DD})$ 26 toward the second power supply terminal $(V_{SS})$ 28 through the vertical signal lines 6 as described above. As a result, a signal potential, corresponding to the quantity of charge that has been created and stored on the pixels on the $i^{th}$ row between the time a-1 during resetting for the electronic shuttering operation and the time b-1, is output onto the vertical signal lines 6.

Subsequently, at a time c, the reset signal $RS_i$ has risen from the "Low" into the "High" level, thereby turning the resetting devices 24 on the $i^{th}$ row ON. On the other hand, the switching devices 25 on the $i^{th}$ row are kept ON. Since the reset signal $RS_i$ has risen to the "High" level, the MOS transistors, which function as the resetting devices 24 on the $i^{th}$ row, have also been turned ON and are now conducting. As a result, the first power supply terminal $(V_{DD})$ 26 is electrically connected to the photodiodes 21, and the charge that has been stored on the photodiodes 21 is drained to the first power supply terminal $(V_{DD})$ 26.

Then, at a time d, the potential state of the photodiodes 21 after resetting is sensed. This sensing operation is performed in the same way as that performed at the time b-1 before resetting. And based on a change in potential state of the photodiodes 21 before and after resetting at the time c, the information that has been stored in the pixels is read out as a signal.

According to this embodiment, at the time a-1, a reset operation for electronic shuttering is being performed on the $i^{th}$ row, while a readout operation is being performed on the $n^{th}$ row. The $n^{th}$ row may be any arbitrary row belonging to either the ordinary imaging section or the dummy imaging section. The readout operation on the $n^{th}$ row is started by turning the switching devices 25 on the $n^{th}$ row ON with the rise of the row select signal $SL_n$ from the "Low" into "High" level. While the switching devices 25 on the $n^{th}$ row are conducting, current flows from the first power supply terminal $(V_{DD})$ 26 toward the second power supply terminal $(V_{SS})$ 28 through the vertical signal lines 6 as described above. As a result, a signal potential, corresponding to the quantity of charge that has been stored on the pixels on the $n^{th}$ row, is output onto the vertical signal lines 6.

If the $n^{th}$ row belongs to the ordinary imaging section, the potential, which has been output onto the vertical signal lines 6 as a result of the readout operation, is usable as an effective pixel signal. In contrast, if the $n^{th}$ row belongs to the dummy imaging section, the potential, which has been output onto the vertical signal lines 6 as a result of the readout operation, is non-usable as an effective pixel signal. The readout operation on the dummy imaging section is performed for the very purpose of making the current flow from the first to second power supply terminal ($V_{DD}$) 26 to ($V_{SS}$) 28 through the vertical signal lines 6 while resetting for the electronic shuttering operation is being performed on the $i^{th}$ row (where $1 \leq i \leq m$).

Hereinafter, the potential states of a photodiode 21 on the $i^{th}$ row while these operations are being performed will be described with reference to FIGS. 7 through 10.

Figure 7:
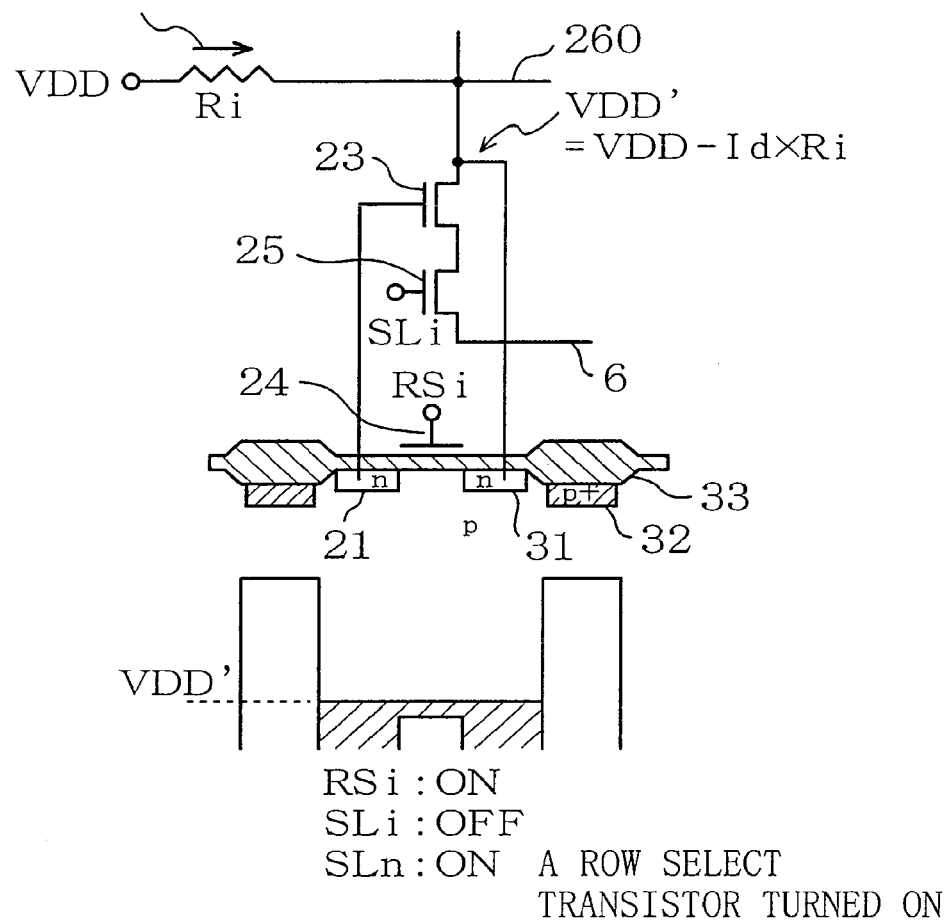

FIG. 7 illustrates an equivalent circuit of a pixel on the $i^{th}$ row, a schematic cross-sectional structure of the resetting device 24 and a distribution of surface potentials at the time a-1. In the example illustrated in FIG. 7, the resetting device 24 is implemented as an n-channel MOS transistor. An n-type doped region of the photodiode 21 also functions as the source region of the resetting device 24. The resetting device 24 is surrounded by a field oxide 33 such as a LOCOS film. A channel stopper 32 doped with a p-type dopant is formed under the field oxide 33.

At the time a-1, resetting for the electronic shuttering operation is being performed. Accordingly, the potential at the photodiode 21 (more specifically, a surface potential of the n-type doped regions of the photodiode 21) is substantially equal to a potential in the drain region 31 of the resetting device 24 (hereinafter, simply referred to as a "reset drain 31"). The reset drain 31 is connected to the first power supply terminal ($V_{DD}$) 26 through the power line 260. Since a readout operation is performed on the $n^{th}$ row according to this embodiment, a source follower current $I_d$ flows through the power line 260. This current $I_d$ is much larger than the current flowing from the first power supply terminal ($V_{DD}$) 26 to the photodiode 21 on the $i^{th}$ row as a result of resetting the photodiode 21 (hereinafter, this current will be referred to as "reset drain current"). For example, the source follower current $I_d$ flowing through the load circuit 30 is on the orders of several to several hundreds μA, whereas the reset drain current is on the orders of several to several hundreds fA. Supposing the principal resistance of the power line is represented as $R_i$, a voltage drop of $I_d \times R_i$ is caused in the power supplied to the reset drain 31. Thus, the potential at the reset drain 31 is represented as $V_{DD}' = V_{DD} - I_d \times R_i$.

The interconnection resistance of the common power line 260 differs depending on the layout thereof, but is ordinarily on the orders of several tens Ω to several kΩ. Suppose the source follower current $I_d$ per pixel is 10 μA, the reset drain current is 10 fA and the interconnection resistance of the common power line 260 is 1 kΩ, for instance. In such a case, the voltage drop of the power supplied to the pixel while the reset drain current is flowing is 10 fA×1 kΩ=10 pV. On the other hand, the voltage drop of the power supplied to the pixel while the source follower current is flowing is 10 μA×1 kΩ=10 mV. As can be seen, since the reset drain current is negligible compared to the source follower current, the effects of the voltage drop thereof are also negligible.

At the time a-1, since the switching device 25 on the $i^{th}$ row is not conducting, no source follower current flows through the switching device 25 on the $i^{th}$ row. It should be noted, however, that the source follower current $I_d$ does flow through the switching device 25 on the $n^{th}$ row. As described above, according to this embodiment, whenever resetting for the electronic shuttering operation is being performed on an arbitrary $i^{th}$ row (where $1 \leq i \leq m$), a readout operation is being performed on another row. This principle is applicable to all the rows within the effective pixel area (where i=1, 2, . . . , m−1, and m).

Figure 8:
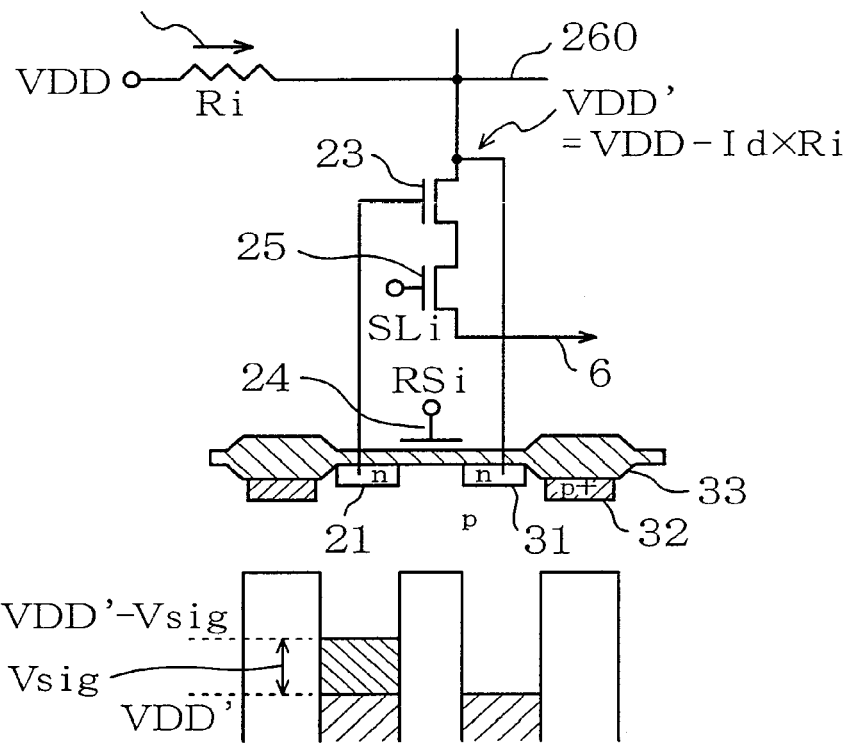

Next, referring to FIG. 8, charge has been stored in the photodiode 21 at the time b-1, when the potential thereof is ($V_{DD}' - V_{sig}$) that has decreased by $V_{sig}$ from the potential $V_{DD}'$ at the time of resetting. The magnitude of $V_{sig}$ is determined depending on the quantity of charge that has been created and stored through photoelectric conversion. This potential ($V_{DD}' - V_{sig}$) is applied to the gate electrode of the driver 23. Also, at the time b-1, the readout operation on the $i^{th}$ row has already been started, and the source follower current $I_d$ is now flowing through the power line 260. This current $I_d$ flows from the first power supply terminal ($V_{DD}$) 26 through the driver 23 and switching device 25 on the $i^{th}$ row into the load circuit 30. Since the readout operation is not being performed on the rows other than the $i^{th}$ row, the source follower current $I_d$ flowing through the other rows at the time b-1 is substantially the same as that at the time a-1. At the time b-1, no reset drain current flows, but this current is negligible as described above.

Then, referring to FIG. 9, resetting for the readout operation is being performed at the time c and the charge that has been stored in the photodiode 21 is being drained to the first power supply terminal ($V_{DD}$) 26. As a result, the potential at the photodiode 21 is equalized with the potential $V_{DD}'$ of the reset drain 31. The potential $V_{DD}'$ is applied to the gate electrode of the driver 23. Accordingly, a signal potential corresponding to the potential $V_{DD}'$ starts to appear on the vertical signal line 6.

Figure 10:
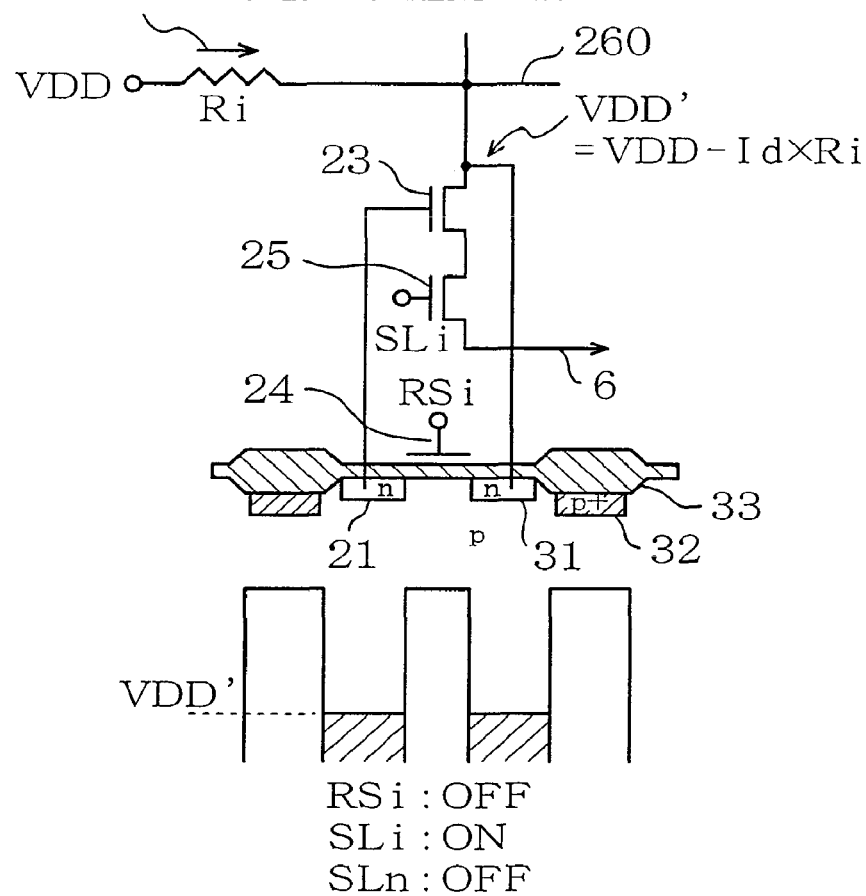

Subsequently, referring to FIG. 10, the resetting device 24 has been turned OFF again at the time d. Immediately after resetting, the potential $V_{DD}'$ was applied to the gate electrode of the driver 23. Accordingly, a signal potential corresponding to the potential $V_{DD}'$ appears on the vertical signal line 6. As a result, the signal information sensed from the pixel on the $i^{th}$ row has a magnitude represented as $V_{DD}' - (V_{DD}' - V_{sig}) = V_{sig}$.

As described above, according to this embodiment, the potential at the photodiode 21 is compulsorily reset at $V_{DD}'$ by resetting for the electronic shuttering operation. If a light blocking metal film made of aluminum, for example, is used as the power line 260 to isolate the respective pixels from each other, then the potentials $V_{DD}'$ can be substantially equalized among all the rows. In other words, the variation in reset potential between a pair of pixel rows can be suppressed. As a result, an image of high quality with reduced horizontal noise can be provided.

Next, it will be described with reference to FIGS. 11 through 14 how horizontal noise is caused in a conventional amplifying solid-state imaging device including no dummy pixels. This device is obtained by removing the dummy pixels and associated row selectors from the device 1 shown in FIG. 3. In this case, the number of horizontal sync signals HD included in one frame interval is not equal to the number of pixel rows.

Figure 11:
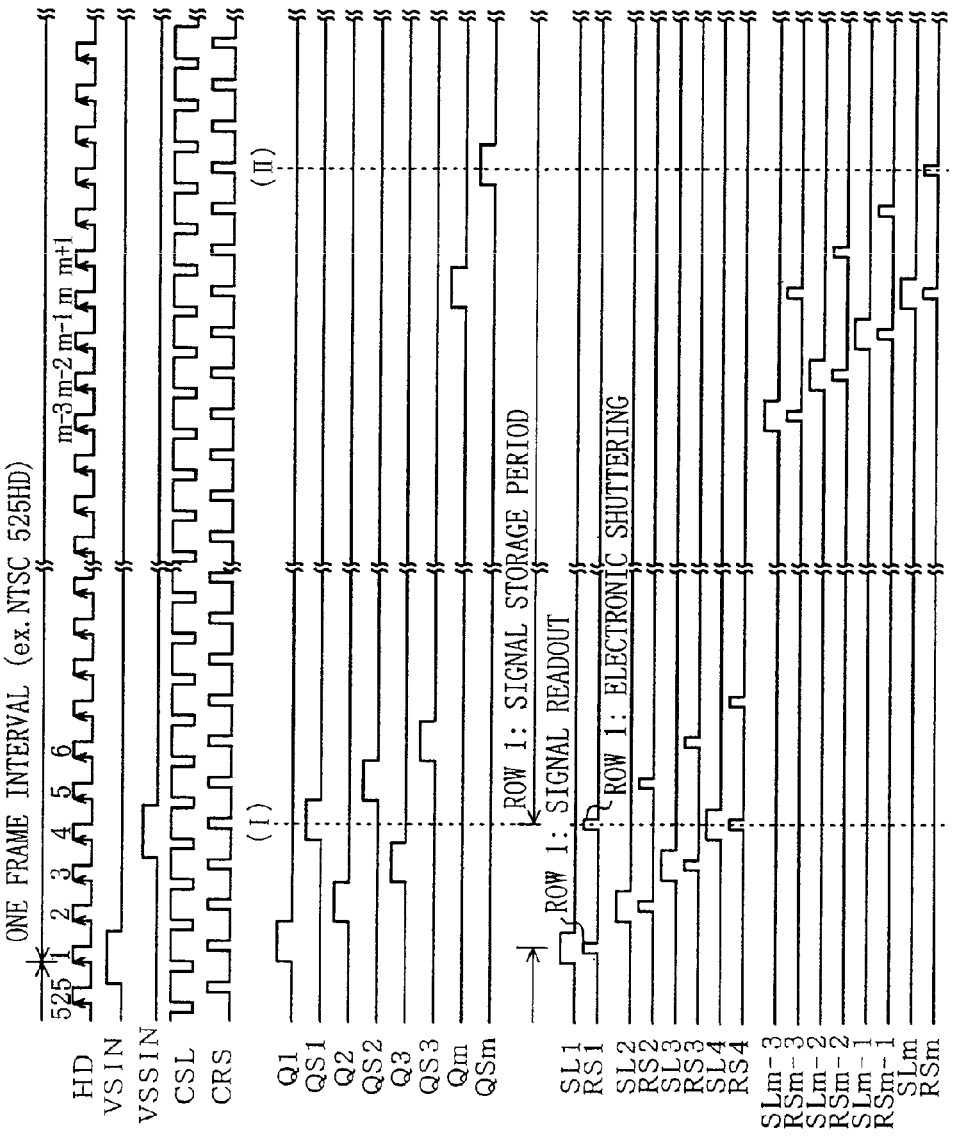
FIG. 11 is a timing diagram illustrating control signals supplied by the row selectors within the row select encoder in the conventional device shown in FIG. 1 including no dummy pixels.

FIG. 11 is a timing diagram illustrating control signals supplied by the row selectors in the row select encoder within the amplifying solid-state imaging device including no dummy pixels as a comparative example of the timing diagram illustrated in FIG. 4. As shown in FIG. 11, resetting for the electronic shuttering operation is being performed on the first row and a readout operation is being performed on the fourth row at a time I. At a time II, resetting for the electronic shuttering operation is being performed on the $m^{th}$ row, but no readout operation is being performed on any row.

Figure 12:
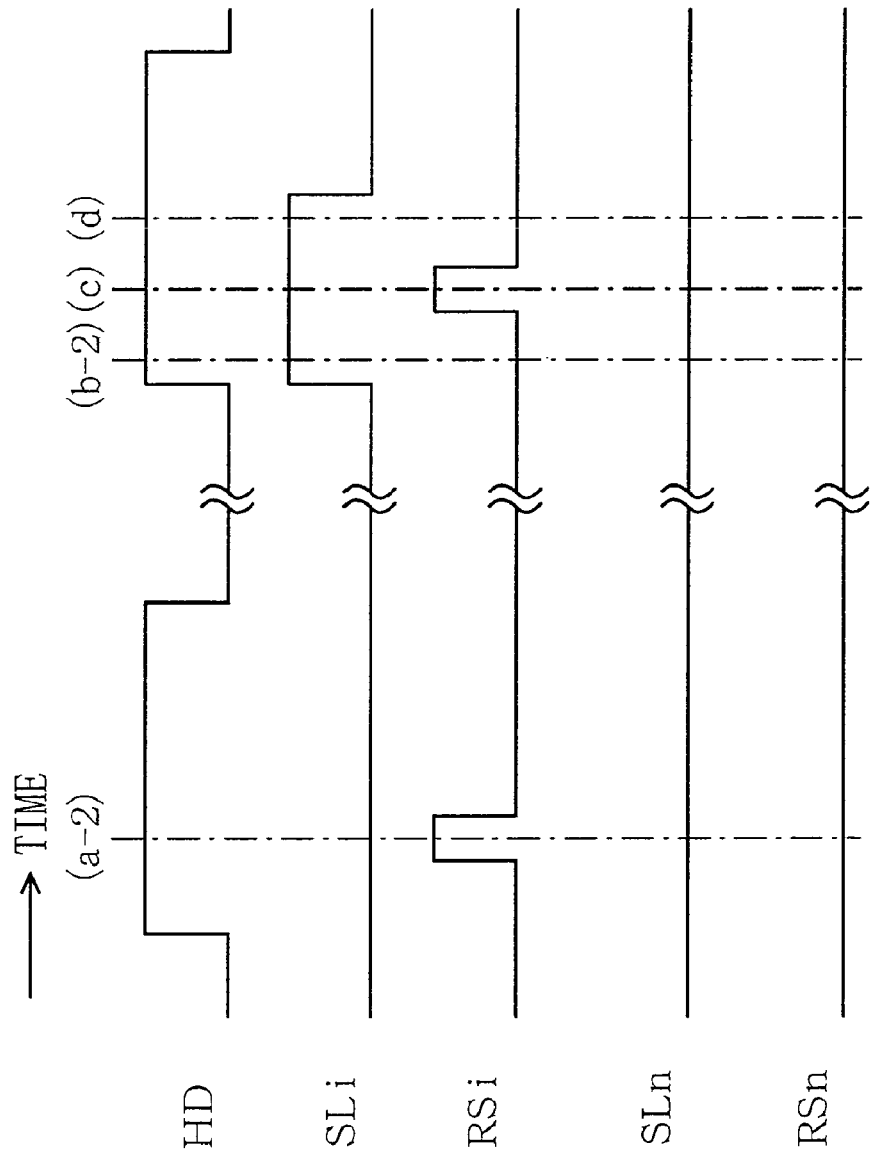
FIG. 12 is a timing diagram illustrating some control signals associated with the $i^{th}$ and $n^{th}$ rows in the conventional device shown in FIG. 1, where $1 \leq i \leq m$ and $n \neq i$.
Figure 13:
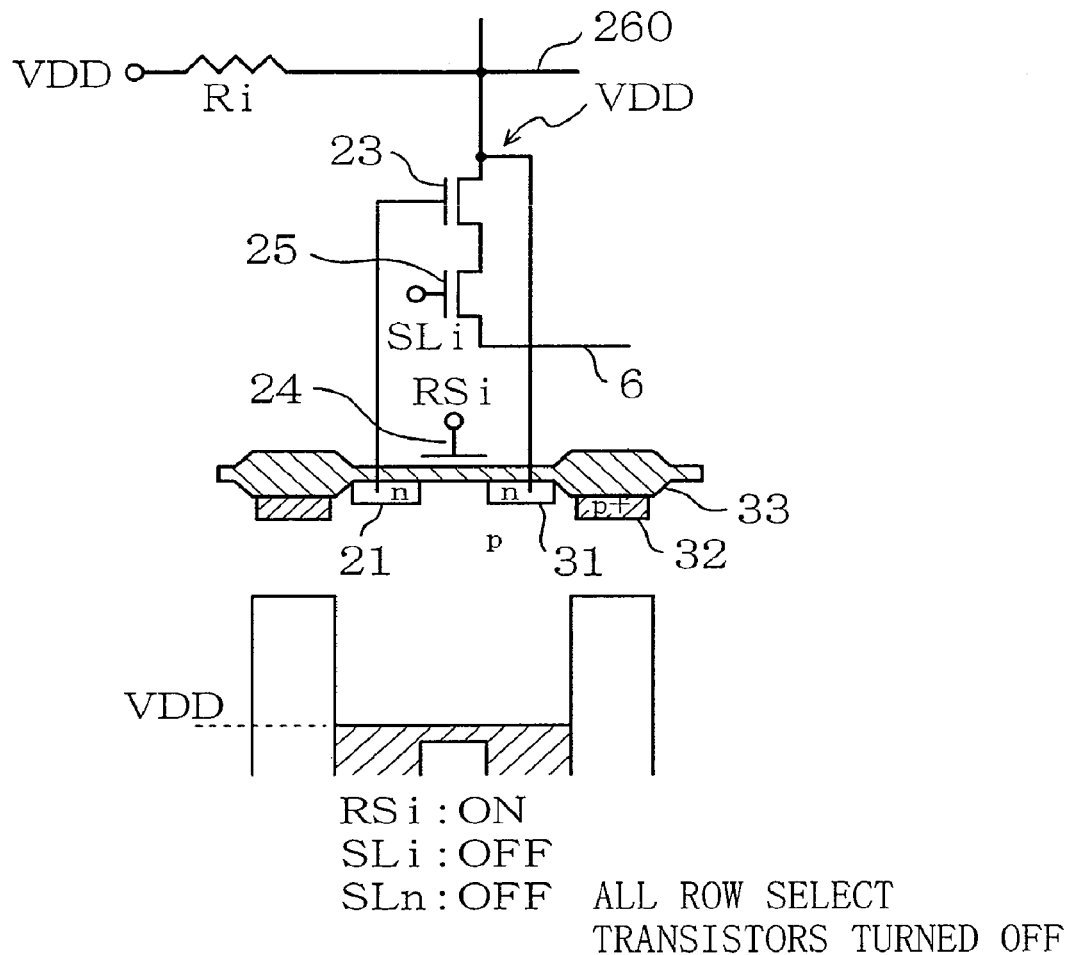
FIGS. 13 and 14 illustrate an equivalent circuit of a pixel on the $i^{th}$ row, a schematic cross-sectional structure of the resetting device and a distribution of surface potentials at the times a-2 and b-2 shown in FIG. 12, respectively.

FIG. 12 is a timing diagram illustrating respective control signals associated with the $i^{th}$ and $n^{th}$ rows, where $i \geq m$, $1 \leq n \leq m$ and $n \neq i$. First, at a time a-2, a control signal for the electronic shuttering operation is being supplied to the $i^{th}$ row. That is to say, the row select signal $SL_i$ remains "Low", but the reset signal $RS_i$ has risen to the "High" level. Accordingly, the resetting devices 24 on the $i^{th}$ row are now conducting. As a result, the potential in the charge storage region of each photodiode 21 is compulsorily reset at the first potential. At the time a-2, no readout operation is being performed on any row other than the $i^{th}$ row. In such a case, resetting for the electronic shuttering operation is being performed as shown in FIG. 13. Accordingly, the potential at the photodiode 21 is equalized with a potential at the reset drain 31. Since no source follower current $I_d$ is flowing through the power line 260 at this time, the potential at the reset drain 31 is substantially equal to $V_{DD}$. Accordingly, the potential at the photodiode 21 after resetting is also $V_{DD}$. Thereafter, the photodiode 21 will create and store charge in a quantity corresponding to the amount of light received.

Figure 14:
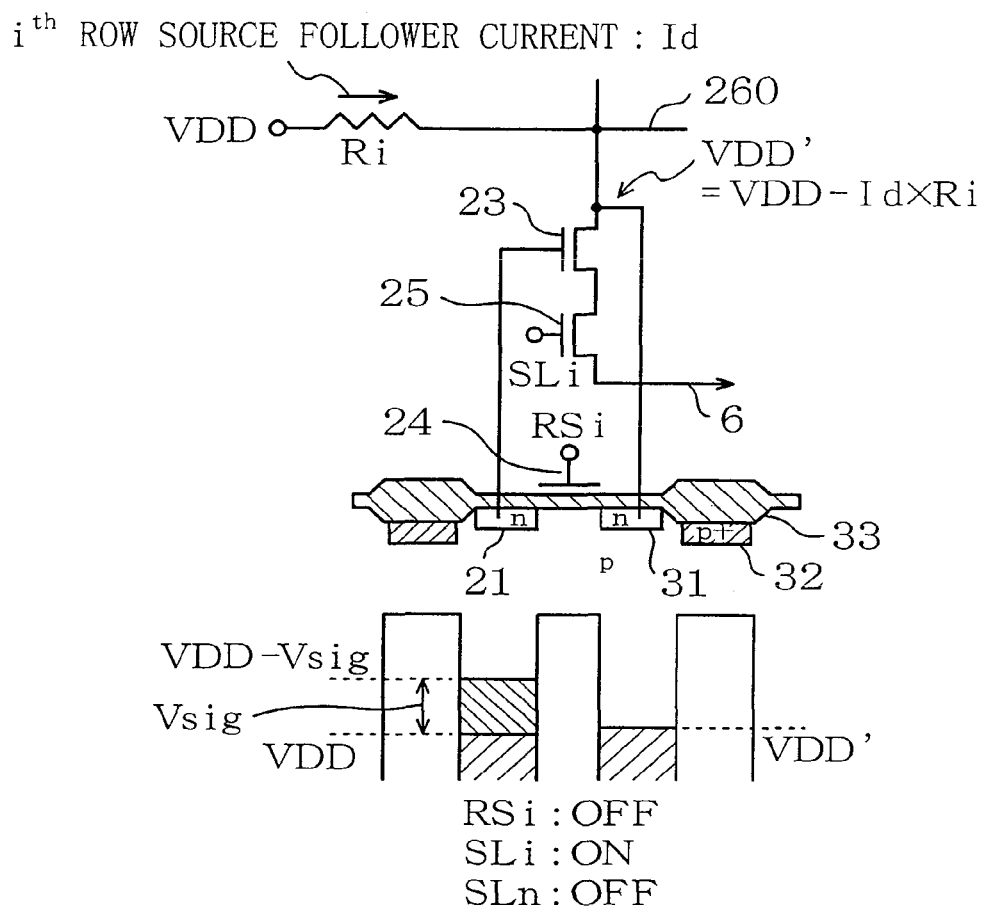

Next, at a time b-2, a readout operation is being performed on the $i^{th}$ row. At this time, the source follower current $I_d$ is now flowing through the power line 260 and the pixel on the $i^{th}$ row as shown in FIG. 14. Accordingly, the potential at the reset drain 31 decreases to $V_{DD}'=V_{DD}-I_d \times R_i$. On the other hand, the potential at the photodiode 21 is ($V_{DD}-V_{sig}$) that has decreased by $V_{sig}$ from the potential $V_{DD}$ at the time of resetting. As described above, the magnitude of $V_{sig}$ is determined depending on the quantity of charge that has been created and stored through photoelectric conversion. This potential ($V_{DD}-V_{sig}$) is applied to the gate electrode of the driver 23.

Subsequently, at a time c, resetting for the readout operation is being performed. At this time, since the source follower current $I_d$ is flowing through the power line 260 and the pixel on the $i^{th}$ row, the potential at the photodiode 21 is compulsorily reset at $V_{DD}'=V_{DD}-I_d \times R_i$.

As a result, the signal information sensed from the pixel on the $i^{th}$ row at the time d has a magnitude corresponding to $V_{DD}'-(V_{DD}-V_{sig})$.

In contrast, if the readout operation is being performed on any other row while resetting for the electronic shuttering operation is being performed on the $i^{th}$ row, then signal information with a magnitude corresponding to $V_{sig}$ is obtained as already described with reference to FIGS. 7 through 10. Accordingly, in the conventional device, a variation corresponding to the potential difference ($V_{DD}'-V_{DD}$) is caused among the output signals of respective rows.

As can be seen from FIG. 11, resetting for the electronic shuttering operation on a particular row and readout on any other row might be performed concurrently in the conventional amplifying solid-state imaging device. In the conventional device, however, while resetting for the electronic shuttering operation is being performed on another particular row (e.g., the $m^{th}$ row), no readout operation might be being performed on any other row. That is to say, the reset state resulting from the electronic shuttering operation differs among the rows, thus causing the horizontal noise.

In contrast, according to the present invention, the electronic shuttering operation is performed under the same condition for the respective rows within the effective pixel area. For that purpose, dummy pixel rows are provided in this embodiment, thereby equalizing the total number of pixel rows with the number of horizontal sync signals (i.e., the HD number) included in one frame interval.

Figure 15:
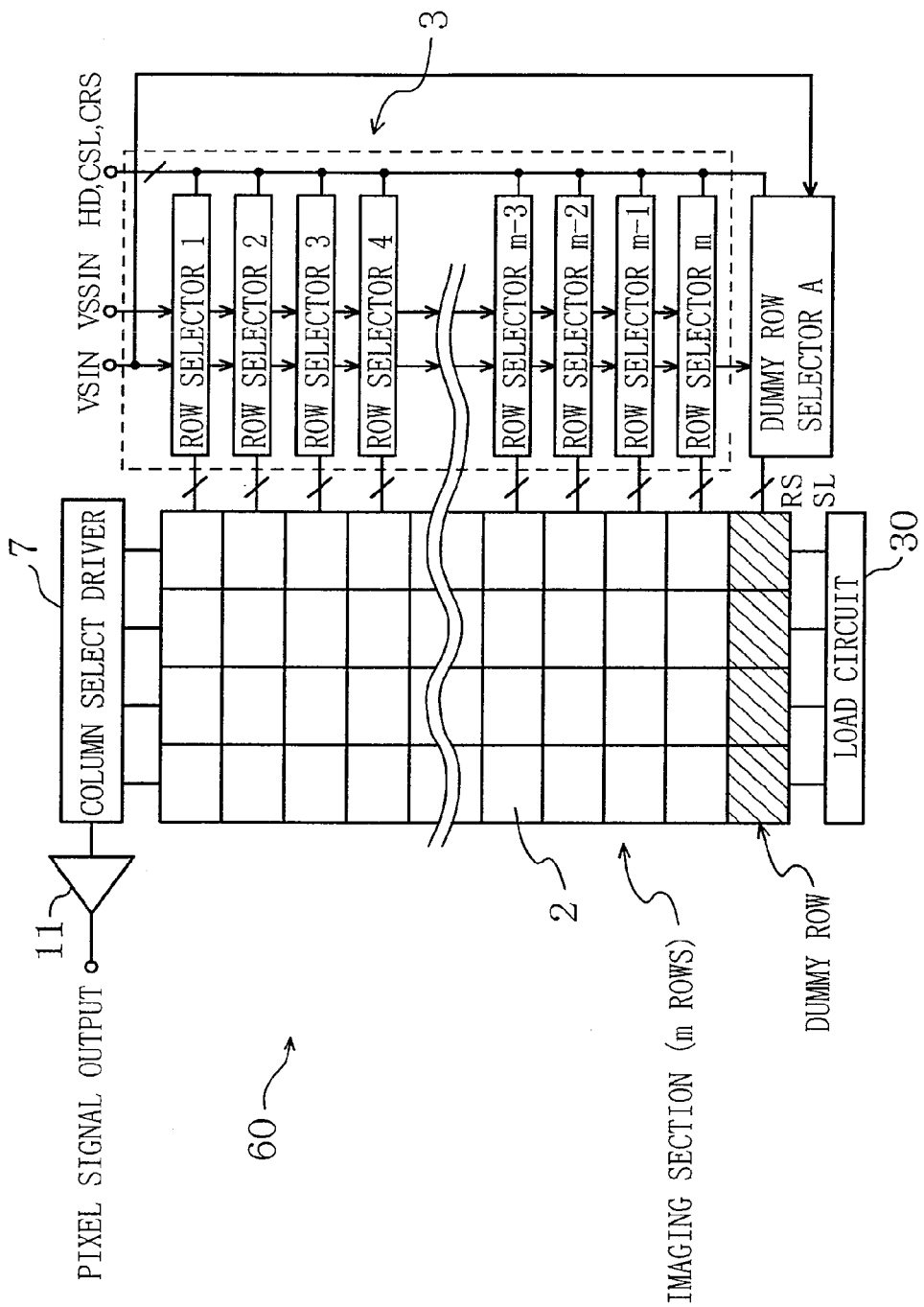
FIG. 15 illustrates a configuration for an amplifying solid-state imaging device according to a second embodiment of the present invention.

FIG. 15 illustrates a configuration for an amplifying solid-state imaging device 60 according to a second embodiment of the present invention. The device 60 is different from the device 1 of the first embodiment in the number of dummy rows. In addition, the device 60 further includes a dummy row selector A unlike the device 1.

According to the second embodiment, the number of dummy rows is one. Also, the dummy row selector A has a different configuration than that of the other first through $m^{th}$ row selectors. It should be noted that according to the first embodiment, the row selectors for the dummy rows have the same configuration as the row selectors for effective pixels.

Figure 16:
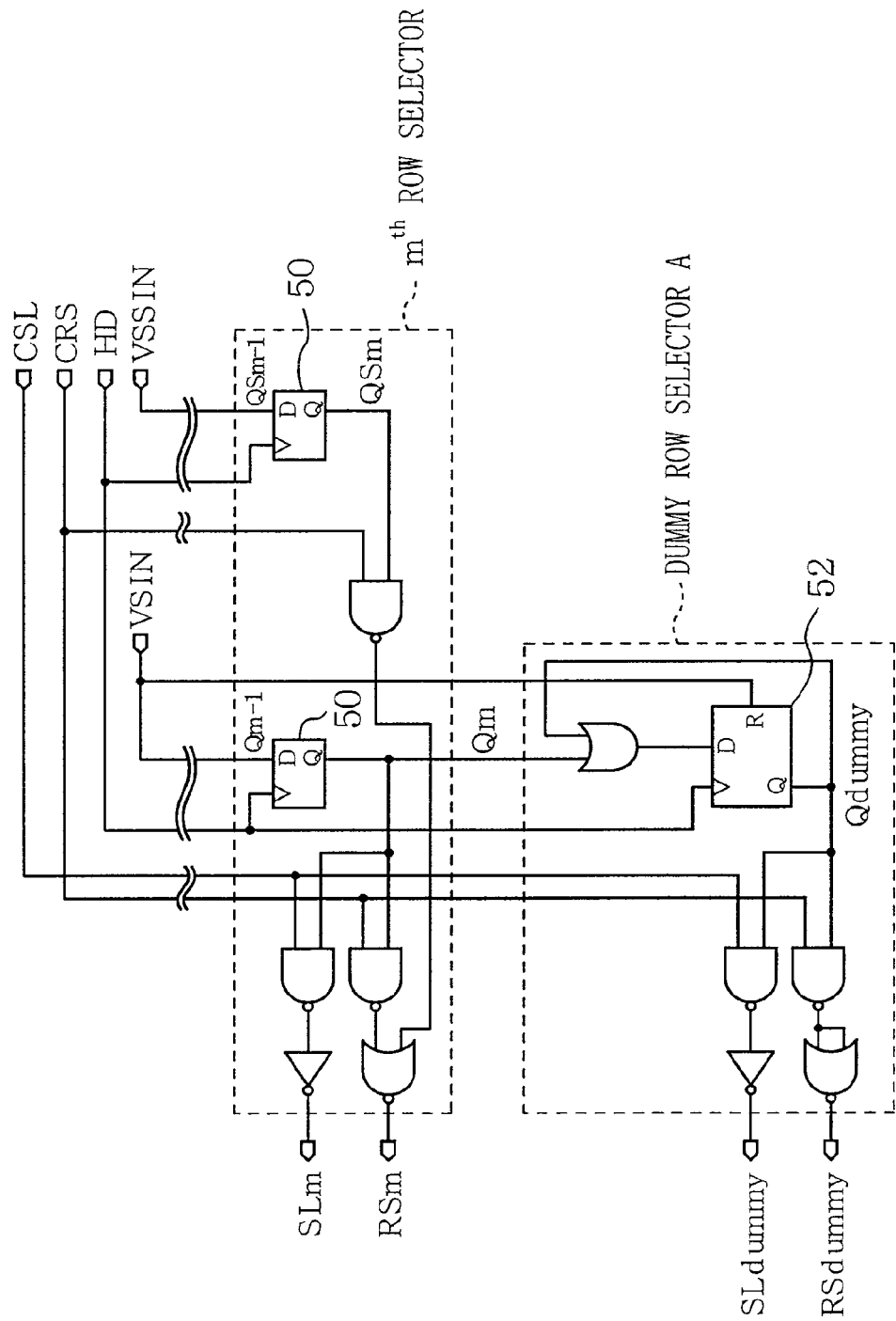
FIG. 16 is a circuit diagram illustrating respective configurations of the row selector associated with the m$^{th}$ row and the dummy row selector in the device shown in FIG. 15.

FIG. 16 illustrates respective configurations of the row selector associated with the $m^{th}$ row and the dummy row selector A. The dummy row selector A includes a D flip-flop 52 with a reset terminal R, at which the start pulse signal VSIN is received. More specifically, the dummy row selector A continuously outputs control signals $SL_{dummy}$ and $RS_{dummy}$ in synchronism with the horizontal sync signal HD after the D flip-flop 52 has received the output Qm of the $m^{th}$ row selector and until a start pulse signal VSIN for the next frame interval is received.

Figure 17:
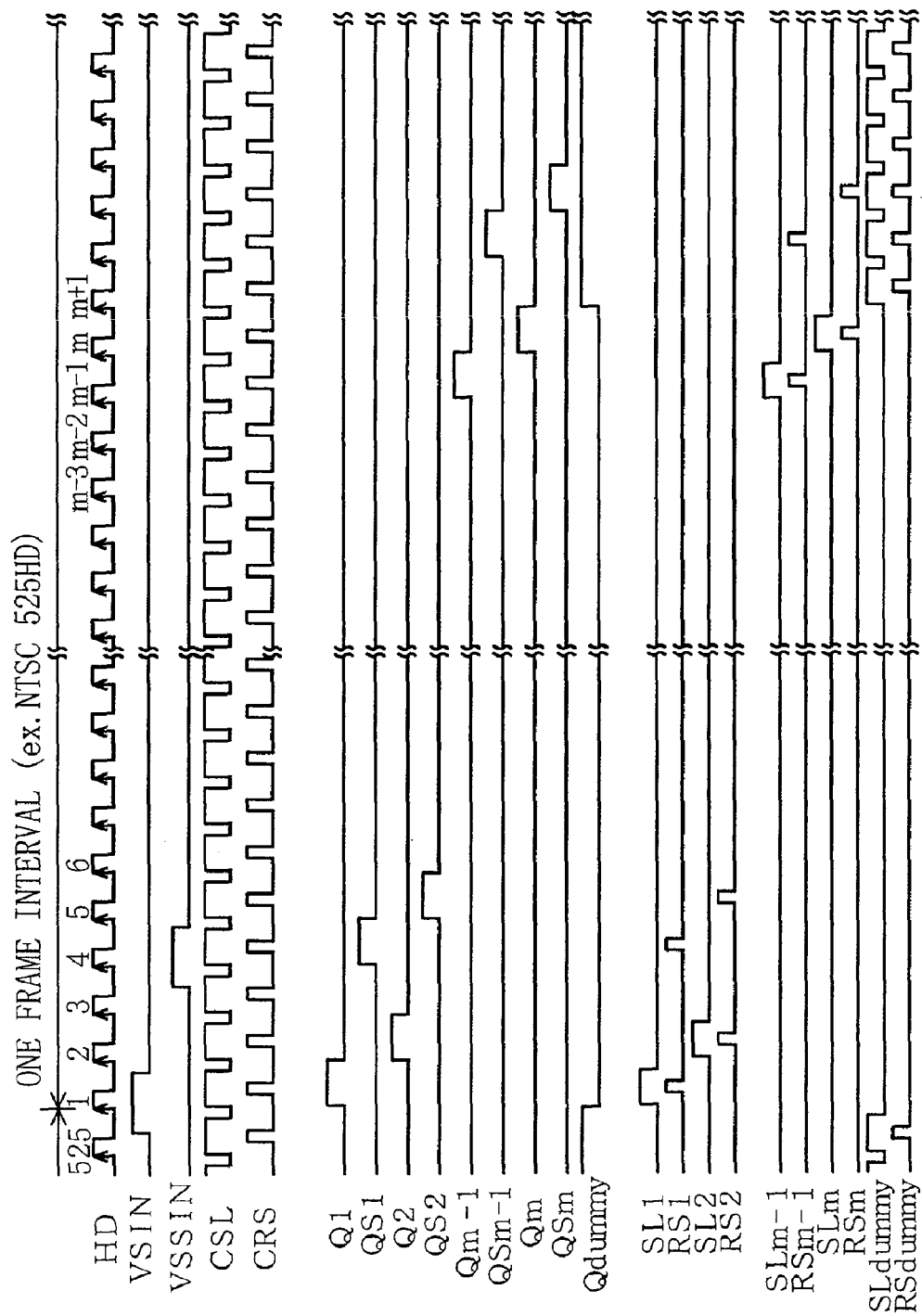
FIG. 17 is a timing diagram illustrating control signals supplied from the row selectors and the dummy row selector in the device shown in FIG. 15.

FIG. 17 is a timing diagram illustrating control signals supplied from the row selectors in the row select encoder 3 and the dummy row selector A within the amplifying solid-state imaging device 60. As shown in FIG. 17, after the readout operation has been performed on the $m^{th}$ row, the row select signal $SL_{dummy}$ and the reset signal $RS_{dummy}$ are repeatedly output in synchronism with the horizontal sync signal HD. In other words, the readout operation is repeatedly performed on the same dummy pixel row. Thus, after the readout operation has been performed on all the rows within the ordinary imaging section and before the next frame interval begins, the readout operation is repeatedly performed on the dummy row, not on the ordinary imaging section. As a result, resetting for the electronic shuttering operation is performed under the same condition on all the rows within the ordinary imaging section.

According to the second embodiment, even if the number of horizontal sync signals included in one frame interval has been changed, the device 60 still can operate normally.

Figure 18:
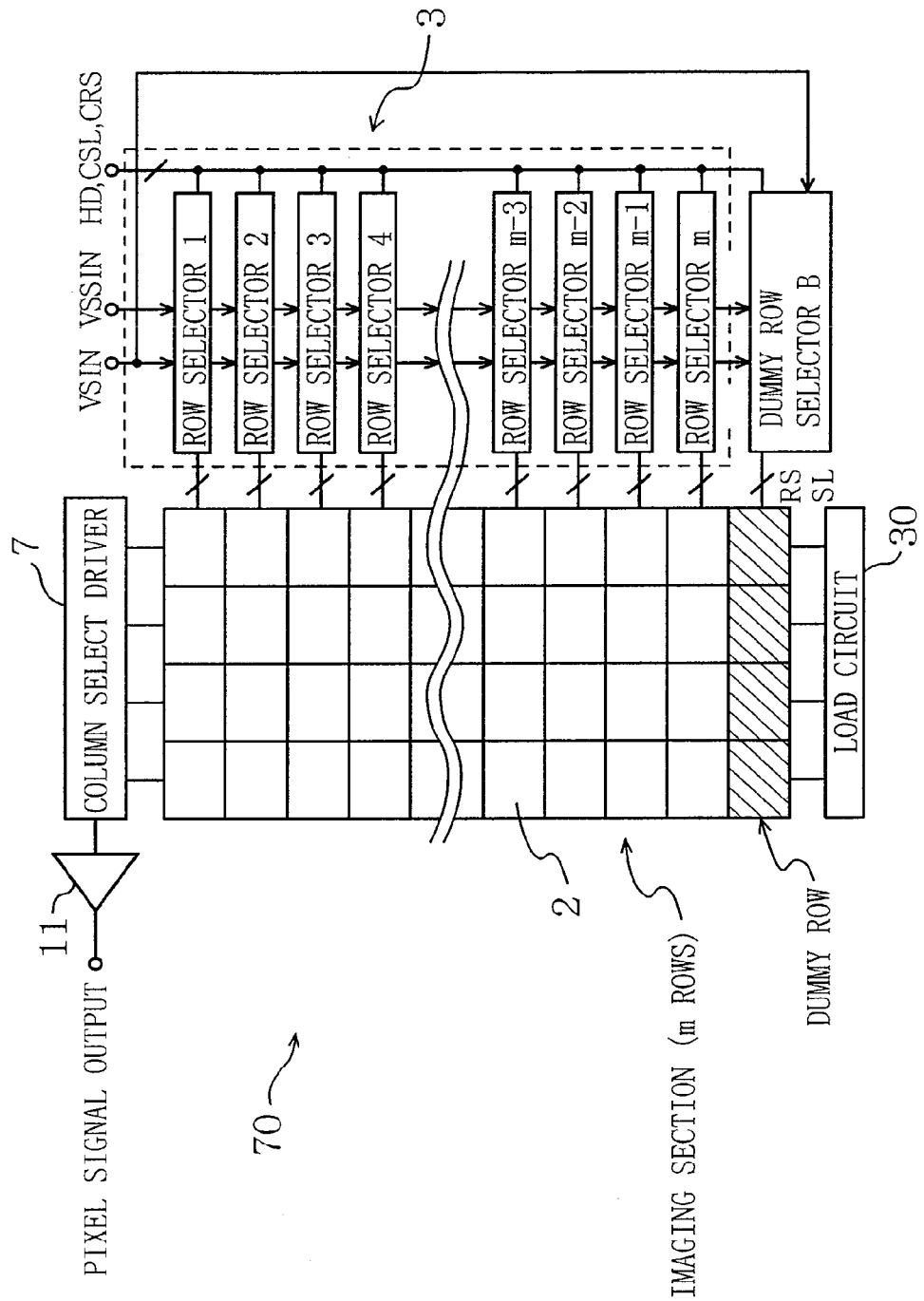
FIG. 18 illustrates a configuration for an amplifying solid-state imaging device according to a third embodiment of the present invention.
Figure 19:
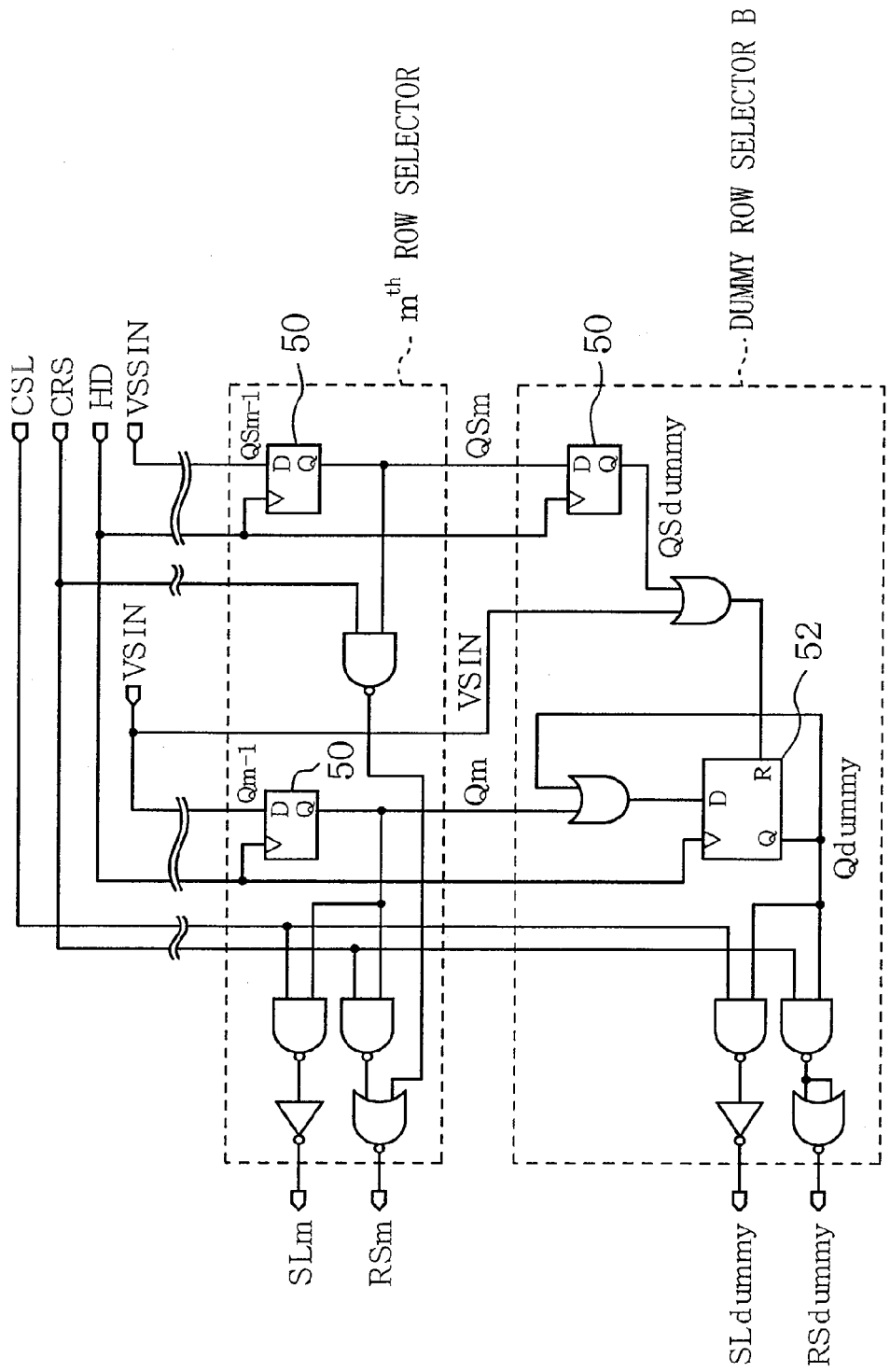
FIG. 19 is a circuit diagram illustrating respective configurations of the row selector associated with the m$^{th}$ row and the dummy row selector in the device shown in FIG. 18.

FIG. 18 illustrates a configuration for an amplifying solid-state imaging device 70 according to a third embodiment of the present invention. The device 70 is different from the device 60 of the second embodiment in the construction of the dummy row selector. The dummy row selector B according to the third embodiment may have a configuration shown in FIG. 19. Responsive to the output Qm of the $m^{th}$ row selector, the dummy row selector B starts to output the control signals $SL_{dummy}$ and $RS_{dummy}$ in synchronism with the horizontal sync signal HD. Thereafter, the dummy row selector B continuously outputs the control signals $SL_{dummy}$ and $RS_{dummy}$ in synchronism with the horizontal sync signal HD until the selector B receives the start pulse signal VSIN or until resetting for the electronic shuttering operation on the $m^{th}$ row ends.

Figure 20:
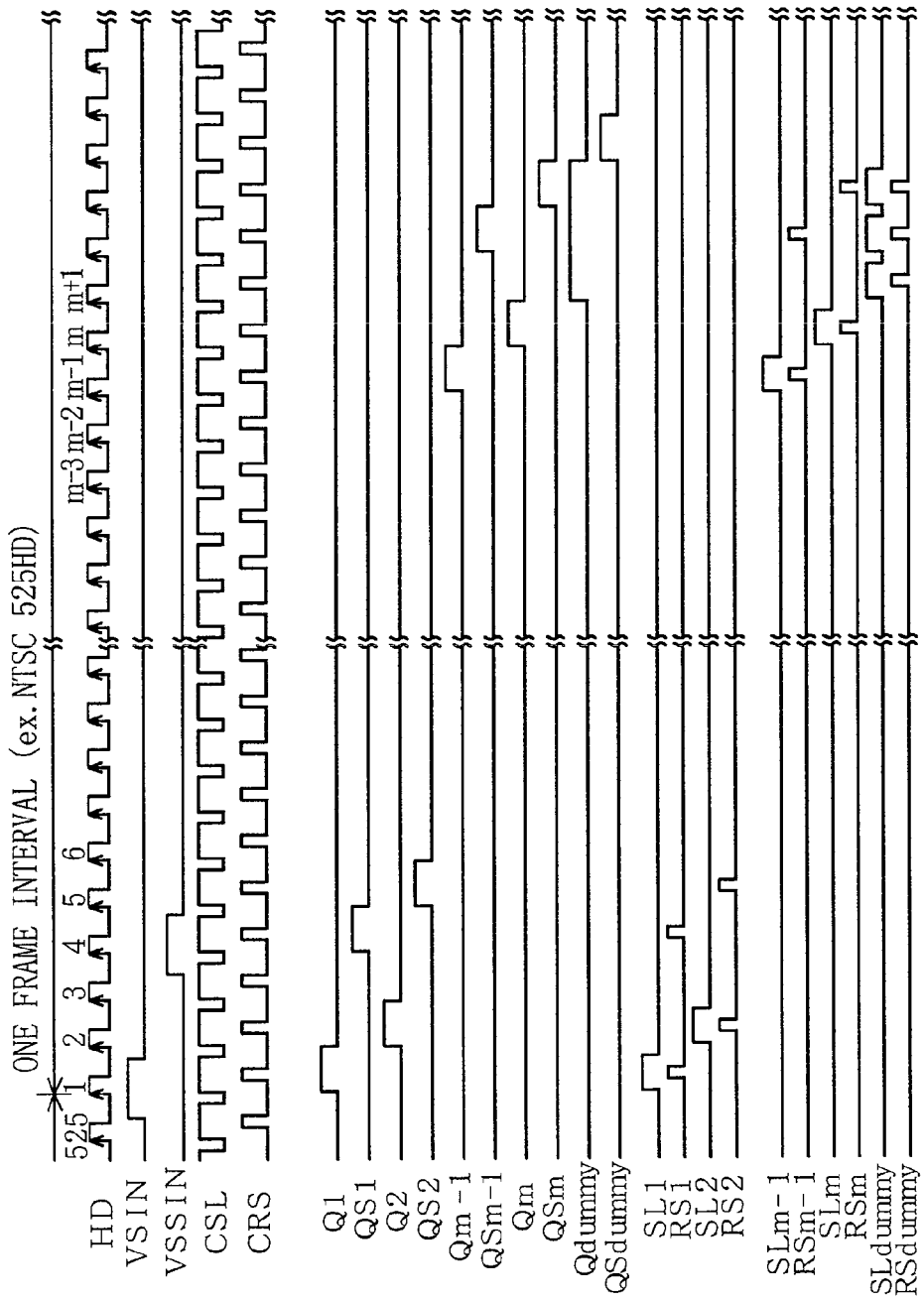
FIG. 20 is a timing diagram illustrating control signals supplied from the row selectors and the dummy row selector in the device shown in FIG. 18.

FIG. 20 is a timing diagram illustrating control signals supplied from the row selectors in the row select encoder 3 and the dummy row selector B within the amplifying solid-state imaging device 70 according to the third embodiment. As shown in FIG. 20, after the readout operation has been performed on the $m^{th}$ row and until resetting for the electronic shuttering operation on the $m^{th}$ row ends, the row select signal $SL_{dummy}$ and the reset signal $RS_{dummy}$ are repeatedly output in synchronism with the horizontal sync signal HD. Thus, after the readout operation has been performed on all the rows within the ordinary imaging section and before resetting for the electronic shuttering operation has been performed on all the rows within the ordinary imaging section, the readout operation is repeatedly performed on the dummy row, not on the ordinary imaging section. As a result, resetting for the electronic shuttering operation is performed under the same condition on all the rows within the ordinary imaging section.

The device 70 according to the third embodiment is more advantageous than the device 60 according to the second embodiment in that the dummy row is driven a required minimum number of times to cut down the power dissipation.

According to the second and third embodiments, just one dummy row is provided. Alternatively, a plurality of dummy row may be provided instead. For example, if two dummy rows are provided, then two dummy row selectors are provided correspondingly. In such a case, the readout operation is performed alternately and repeatedly on these dummy rows in synchronism with the horizontal sync signal HD.

Also, according to the second and third embodiments, the readout operation on the dummy row is performed at a relatively late stage of a frame interval. However, according to the first embodiment, the readout operation on the dummy row may be performed at a relatively early stage of the frame interval. In the example illustrated in FIG. 3, the dummy rows (i.e., the $(m+1)^{th}$ through $525^{th}$ rows) are disposed under the effective pixel area (i.e., the $1^{st}$ through $m^{th}$ rows). Alternatively, these dummy rows may be disposed over the effective pixel area.

In the foregoing embodiments, the reset signal for the electronic shuttering operation is generated within the row select encoder 3 and then output therefrom. However, the present invention is in no way limited to such a specific embodiment. For example, a circuit for generating the reset signal for the electronic shuttering operation may be disposed on the left-hand side of the imaging section shown in FIG. 3. And a circuit for outputting a control signal for the readout operation (row selectors) may be disposed on the right-hand side of the imaging section. Also, the disposition of these circuits may be inverted horizontally.

Figure 21:
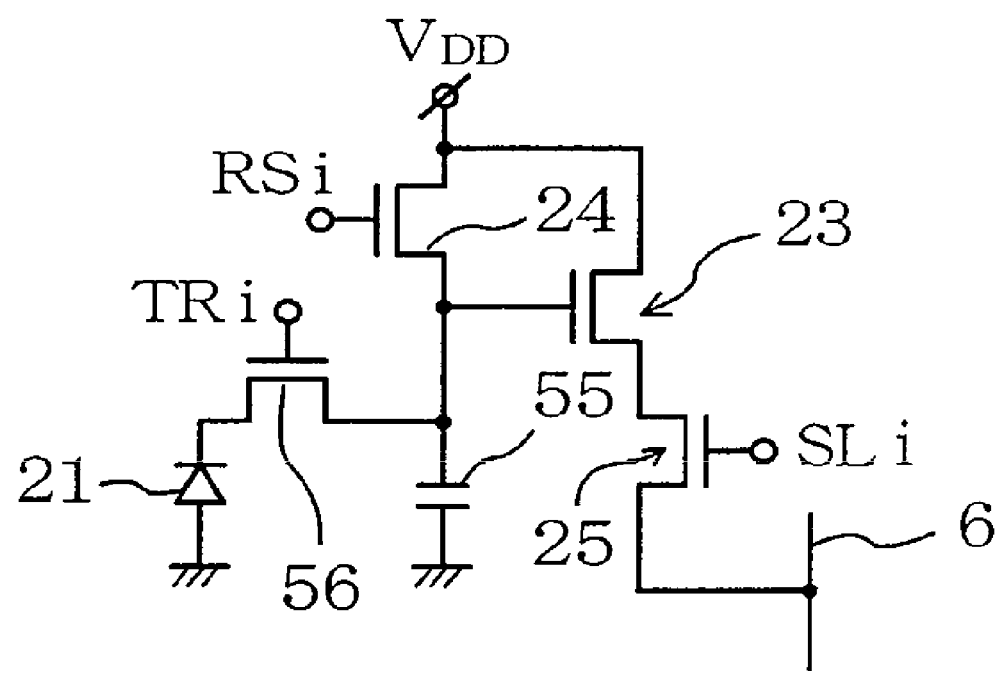
FIG. 21 is a circuit diagram illustrating another exemplary pixel configuration usable according to the present invention.

Moreover, according to the present invention, a pixel with a configuration shown in FIG. 21 may also be used. In the pixel shown in FIG. 21, a transfer gate 56 is provided in addition to the photodiode 21 within the signal storage section and a potential of a capacitor 55, which is connected to a signal storage node, is applied to the gate electrode of the driver 23. In other words, the source follower circuit senses a potential at the signal storage node. As can be seen, the present invention is not limited to the pixel configuration exemplified in the foregoing embodiments. In FIG. 21, a signal $TR_1$ is supplied to the transfer gate 56 for controlling the ON/OFF states thereof.

The present invention is generally applicable to any MOS solid-state imaging device of such a type as amplifying and sensing signal charge stored on a pixel by making current flow through a load circuit. For example, a signal detector may be constructed using an inverter instead of the source follower circuit. The key point is that the detector is at least required to sense, amplify and output signal charge stored within a pixel before and after resetting.

In the foregoing embodiments, the row select encoder 3 includes two columns of vertical shift registers. Thus, the rows are selected sequentially in a physical space. Alternatively, a row select encoder for accessing rows located at physically random positions may also be used.

What is claimed is:

1. A method for driving an imaging device which includes a plurality of pixel rows provided within an effective pixel area, at least one dummy pixel row provided in an area other than the effective pixel area, and an electronic shuttering operation for discharging signal charge of a signal charge storage section by a reset element within the effective pixel area, the method comprising:

selecting a row to perform a readout operation from the plurality of pixel rows, while another row being selected to perform an electronic shuttering operation from the plurality of pixel rows, and selecting a row to perform the readout operation from the at least one dummy pixel row while another row being selected to perform the electronic shuttering operation from the plurality of pixel rows, wherein the dummy pixel row is selected to perform the readout operation thereon so that the total of the number of currently selected rows to perform the readout operation is constant during the period in which the imaging device operates in the electronic shuttering mode.

* * * * *